(12) United States Patent
Park

(10) Patent No.: US 10,761,619 B2
(45) Date of Patent: Sep. 1, 2020

(54) TOUCH-SENSING SYSTEM, DISPLAY DEVICE, ACTIVE PEN, AND PEN RECOGNITION METHOD

(71) Applicant: LG Display Co., Ltd., Seoul (KR)

(72) Inventor: Hyunkyu Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/856,394

(22) Filed: Dec. 28, 2017

(65) Prior Publication Data

US 2018/0188836 A1 Jul. 5, 2018

(30) Foreign Application Priority Data

Dec. 30, 2016 (KR) .................. 10-2016-0184105

(51) Int. Cl.
*G06F 3/0354* (2013.01)
*G06F 3/041* (2006.01)
*G08C 17/02* (2006.01)
*G06F 3/044* (2006.01)

(52) U.S. Cl.
CPC ........ *G06F 3/03545* (2013.01); *G06F 3/0416* (2013.01); *G06F 3/0441* (2019.05); *G06F 3/0442* (2019.05); *G08C 17/02* (2013.01); *H04Q 2213/13175* (2013.01)

(58) Field of Classification Search
CPC .... G06F 3/03545; G06F 3/0416; G06F 3/044; G06F 2203/0384; G06F 3/04162; G06F 3/0441; G06F 3/0442
See application file for complete search history.

(56) References Cited

U.S. PATENT DOCUMENTS

| | | | |
|---|---|---|---|
| 6,441,810 B1 * | 8/2002 | Skoog | G06F 3/03545 178/19.01 |
| 8,963,889 B2 * | 2/2015 | Oda | G06F 3/046 345/179 |
| 9,495,056 B2 * | 11/2016 | Takeda | G06F 3/03 |
| 9,501,091 B2 * | 11/2016 | Takeda | G06F 3/03 |
| 9,606,646 B2 * | 3/2017 | Westhues | G06F 3/0412 |
| 9,619,051 B2 * | 4/2017 | Ryshtun | G06F 3/0416 |
| 9,658,720 B2 * | 5/2017 | Kremin | G06F 3/03545 |
| 9,763,087 B2 * | 9/2017 | Westhues | H04W 12/04 |
| 9,785,262 B2 * | 10/2017 | Fleck | G06F 3/03545 |
| 9,916,022 B2 * | 3/2018 | Westhues | G06F 3/0412 |
| 9,977,519 B2 * | 5/2018 | Lukanc | G06F 3/0383 |
| 10,028,137 B2 * | 7/2018 | Westhues | H04W 12/04 |
| 10,042,477 B2 * | 8/2018 | King-Smith | G06F 3/03545 |
| 10,055,036 B2 * | 8/2018 | Koike | G06F 3/0383 |
| 10,061,407 B2 * | 8/2018 | Hara | G06F 3/03545 |
| 10,168,831 B2 * | 1/2019 | Oakley | G06F 3/0418 |
| 10,209,829 B2 * | 2/2019 | Hara | G06F 3/0416 |
| 10,289,221 B2 * | 5/2019 | Kagami | G06F 3/044 |
| 10,324,547 B2 * | 6/2019 | Han | G06F 3/0383 |
| 10,401,985 B2 * | 9/2019 | Hara | G06F 3/0442 |
| 10,452,168 B2 * | 10/2019 | Oda | G06F 3/041 |

(Continued)

*Primary Examiner* — Michael J Jansen, II
(74) *Attorney, Agent, or Firm* — Polsinelli PC

(57) ABSTRACT

Disclosed are a touch-sensing system, a display device, an active pen, and a pen recognition method which can perform rapid and accurate pen recognition as the active pen provides pen identification information to the display device through a predetermined path, and which can also simultaneously process pen inputs through many active pens by distinguishably recognizing the many pens.

19 Claims, 19 Drawing Sheets

(56) References Cited

U.S. PATENT DOCUMENTS

| | | | |
|---|---|---|---|
| 10,474,286 B2* | 11/2019 | Bae | G06F 3/044 |
| 2002/0050983 A1* | 5/2002 | Liu | G06F 3/03545 |
| | | | 345/173 |
| 2011/0169756 A1* | 7/2011 | Ogawa | G06F 3/03545 |
| | | | 345/173 |
| 2011/0193776 A1* | 8/2011 | Oda | G06F 3/046 |
| | | | 345/157 |
| 2012/0013555 A1* | 1/2012 | Maeda | G06F 3/03545 |
| | | | 345/173 |
| 2012/0105361 A1* | 5/2012 | Kremin | G06F 3/03545 |
| | | | 345/174 |
| 2015/0002415 A1* | 1/2015 | Lee | G06F 3/03545 |
| | | | 345/173 |
| 2015/0062094 A1* | 3/2015 | Ryshtun | G06F 3/0416 |
| | | | 345/179 |
| 2015/0212597 A1* | 7/2015 | Westhues | G06F 3/0412 |
| | | | 345/174 |
| 2015/0277658 A1* | 10/2015 | King-Smith | G06F 3/03545 |
| | | | 345/174 |
| 2015/0355762 A1* | 12/2015 | Tripathi | H04N 3/24 |
| | | | 345/173 |
| 2016/0014598 A1* | 1/2016 | Westhues | H04W 12/04 |
| | | | 380/259 |
| 2016/0091919 A1* | 3/2016 | Takeda | G06F 3/03 |
| | | | 345/174 |
| 2016/0098124 A1* | 4/2016 | Takeda | G06F 3/044 |
| | | | 345/174 |
| 2016/0117019 A1* | 4/2016 | Takeda | G06F 3/03 |
| | | | 345/174 |
| 2016/0195977 A1* | 7/2016 | Reynolds | G06F 3/0416 |
| | | | 345/174 |
| 2016/0246390 A1* | 8/2016 | Lukanc | G06F 3/0383 |
| 2016/0306447 A1* | 10/2016 | Fleck | G06F 3/03545 |
| 2016/0320918 A1* | 11/2016 | Hara | G06F 3/03545 |
| 2016/0378257 A1* | 12/2016 | Oakley | G06F 3/03 |
| | | | 345/175 |
| 2017/0102826 A1* | 4/2017 | Hamaguchi | G06F 3/044 |
| 2017/0192534 A1* | 7/2017 | Han | G06F 3/0383 |
| 2017/0192535 A1* | 7/2017 | Westhues | G06F 3/0412 |
| 2017/0192549 A1* | 7/2017 | Katayama | G06F 3/041 |
| 2017/0220138 A1* | 8/2017 | Kagami | G06F 3/044 |
| 2017/0228049 A1* | 8/2017 | Yamamoto | G06F 3/044 |
| 2017/0285772 A1* | 10/2017 | Yamamoto | G06F 3/044 |
| 2017/0364208 A1* | 12/2017 | King-Smith | G06F 3/03545 |
| 2018/0014186 A1* | 1/2018 | Westhues | H04W 12/04 |
| 2018/0018031 A1* | 1/2018 | Fleck | G06F 3/0418 |
| 2018/0024654 A1* | 1/2018 | Koike | G09G 3/20 |
| | | | 345/174 |
| 2018/0024658 A1* | 1/2018 | Yamamoto | G06F 3/03545 |
| | | | 345/179 |
| 2018/0046272 A1* | 2/2018 | Hara | G06F 3/044 |
| 2018/0052532 A9* | 2/2018 | Kagami | G06F 3/044 |
| 2018/0113519 A1* | 4/2018 | Yamamoto | B43L 7/00 |
| 2018/0113559 A1* | 4/2018 | Bae | G06F 3/03545 |
| 2018/0120962 A1* | 5/2018 | Hara | G06F 3/044 |
| 2018/0157341 A1* | 6/2018 | Oda | G06F 3/03 |
| 2018/0188836 A1* | 7/2018 | Park | G06F 3/044 |
| 2018/0329528 A1* | 11/2018 | Hara | G02F 1/13338 |
| 2018/0356908 A1* | 12/2018 | Koike | G06F 3/03545 |

\* cited by examiner

Operation Mode

FIG. 12B

| Mode | | | | | | | | Full Scan(Finger & Pen Searching) mode | | | | | | | | |
|---|---|---|---|---|---|---|---|---|---|---|---|---|---|---|---|---|
| Blank Period | 1 | 2 | 3 | 4 | 5 | 6 | 7 | 8 | 9 | 10 | 11 | 12 | 13 | 14 | 15 | 16 |
| Panel | ULNK DLNK BCON LFD | ULNK DLNK PNG LFD | ULNK DLNK PNG LFD | ULNK DLNK PNG LFD | ULNK DLNK PNG LFD | ULNK DLNK PNG LFD | ULNK DLNK PNG LFD | ULNK DLNK BCON LFD | ULNK DLNK PNG LFD | ULNK DLNK PNG LFD | ULNK DLNK PNG LFD | ULNK DLNK PNG LFD | ULNK DLNK PNG LFD | ULNK DLNK PNG LFD | ULNK DLNK PNG LFD | ULNK DLNK PNG LFD |
| Finger Location | FLOC | FLOC | FLOC | FLOC | FLOC | FLOC | FLOC | FLOC | FLOC | FLOC | FLOC | FLOC | FLOC | FLOC | FLOC | FLOC |
| Pen Location | | PLOC | PLOC | PLOC | PLOC | PLOC | PLOC | PLOC | PLOC | PLOC | PLOC | PLOC | PLOC | PLOC | PLOC | PLOC |
| Pen ID | | PID | PID | PID | PID | PID | PID | PID | PID | PID | PID | PID | PID | PID | PID | PID |

TOUCH-SENSING SYSTEM, DISPLAY DEVICE, ACTIVE PEN, AND PEN RECOGNITION METHOD

CROSS REFERENCE TO RELATED APPLICATION

This application claims priority from Korean Patent Application No. 10-2016-0184105, filed Dec. 30, 2016, which is hereby incorporated by reference in its entirety for all purposes as if fully set forth herein.

BACKGROUND OF THE DISCLOSURE

Field of the Disclosure

The present disclosure relates to a display device, and more particularly, to a touch-sensing system, a display device, an active pen, and a pen recognition method.

Description of the Background

According to the development of the information society, demand for display devices for displaying images in various forms has increased, and recently, a variety of display devices, such as liquid crystal display devices, plasma display devices and organic light-emitting display devices, have come to be used.

Among such display devices, there is a display device that may provide a touch-based input scheme to allow a user to easily, intuitively, and conveniently input information or instructions, departing from the conventional input scheme using a button, a keyboard, or a mouse.

Furthermore, these days, requirements for application functions of accurate location designation, movement trace input, and writing input beyond a simple touch are increasing.

Accordingly, the display device should be able to not only accurately sense a simple touch by a finger or a pen, but also perform accurate pen recognition for accurate location designation, movement trace input, and writing input.

However, since accurate pen recognition cannot be performed at present, the user feels awkwardness or inconvenience when performing the pen input.

Also, since it is impossible to process simultaneous recognition of multiple pens, multiple pens cannot be used in one display device.

SUMMARY

With this background, the present aspects may provide a touch-sensing system, a display device, an active pen, and a pen recognition method capable of performing rapid and accurate pen recognition.

The present aspects may provide a touch-sensing system, a display device, an active pen, and a pen recognition method capable of simultaneously processing pen inputs through many active pens by distinguishably recognizing many active pens and distinguishably processing pen data of the many active pens.

The present aspects may provide a touch-sensing system, a display device, an active pen, and a pen recognition method capable of transmitting and receiving reliable information required for pen recognition when a signal is transmitted and received between the active pen and the display device for pen recognition.

The present aspects may provide a touch-sensing system, a display device, an active pen, and a pen recognition method capable of accurately and rapidly sensing a touch made with a finger and a touch with an active pen at the same time.

The present aspects will be described in more detail.

The present aspects may provide a touch-sensing system including an active pen and a display device that includes a panel, on which a plurality of touch electrodes are arranged, and which performs pen recognition processing based on a link with the active pen.

The active pen may radiate a pen pulse signal indicating pen identification information to the panel through a pen tip and wirelessly transmit pen data through an embedded pen wireless communication unit.

The display device may include a touch-sensing circuit configured to supply a first panel-driving pulse signal to the panel and output raw data read from the panel, to which the pen pulse signal is radiated, a wireless communication module configured to receive and output the pen data wirelessly transmitted from the active pen, and a touch controller configured to acquire pen identification information from the raw data output from the touch-sensing circuit and perform pen recognition processing based on the acquired pen identification information and the pen data output from the wireless communication module.

The active pen may wirelessly transmit the pen identification information in addition to the pen data including one or more of a writing pressure, a pen inclination, and control information through the pen wireless communication unit.

In this case, the wireless communication module of the display device may receive pen identification information and pen data and output the received pen identification information and pen data to the touch controller.

The touch controller may perform pen recognition processing based on the raw data output from the touch-sensing circuit and the pen data and the pen identification information output from the wireless communication module.

The present aspects may provide a display device configured to perform pen recognition processing based on a link with an active pen.

The display may include a panel on which a plurality of touch electrodes are arranged, a touch-sensing circuit configured to, as a first panel-driving pulse signal is supplied to the panel, output raw data generated by reading a pen pulse signal, radiated from the active pen to the panel and indicating pen identification information, through the panel, a wireless communication module configured to receive and output pen data wirelessly transmitted from the active pen, and a touch controller configured to acquire pen identification information from the raw data output from the touch-sensing circuit and perform pen recognition processing based on the acquired pen identification information and the pen data output from the wireless communication module.

The present aspects may provide a panel that includes a plurality of data lines arranged in a first direction, a plurality of gate lines arranged in a second direction, and a plurality of touch electrodes for touch sensing, and that links with an active pen.

In a display-driving section, an image data signal may be applied to the plurality of data lines and a gate signal may be applied to the plurality of gate lines.

A touch-driving section, corresponding to a blank section between two display-driving sections, may include an uplink transmission section and a downlink transmission section.

In the downlink transmission section within the touch-driving section, a first panel-driving pulse signal may be applied to all or some of the plurality of touch electrodes.

In the uplink transmission section within the touch-driving section, a second panel-driving pulse signal or a third panel-driving pulse signal, distinguished from the first panel-driving pulse signal, may be applied to all or some of the plurality of touch electrodes.

In the downlink transmission section within the touch-driving section, a signal corresponding to the first panel-driving pulse signal may be applied to all or some of the plurality of data lines.

In the downlink transmission section within the touch-driving section, a signal corresponding to the first panel-driving pulse signal may be applied to all or some of the plurality of gate lines.

The present aspects may provide an active pen that includes a pen tip in contact with or in proximity to a panel of the display device, an analog front-end receiver configured to receive a first panel-driving pulse signal supplied to the panel through the pen tip, an analog front-end transmitter configured to radiate a pen pulse signal indicating pen identification information through the pen tip based on the first panel-driving pulse signal, and a pen wireless communication unit configured to wirelessly transmit pen data.

The pen wireless communication unit may wirelessly transmit the pen identification information in addition to the pen data.

The present aspects may provide a pen recognition method including a step of supplying a first panel-driving pulse signal to a panel by the display device, a step of radiating a pen pulse signal indicating pen identification information to the panel through a pen tip based on the first panel-driving pulse signal and wirelessly transmitting pen data by the active pen, and a step of performing pen recognition processing based on raw data generated by being read from the panel, to which the pen pulse signal is radiated, and the pen data wirelessly transmitted from the active pen by the display device.

The active pen may wirelessly transmit the pen identification information in addition to the pen data.

The present aspects may provide a touch-sensing system including an active pen and a display device that includes a panel, on which a plurality of touch electrodes are arranged, and that performs pen recognition processing based on a link with the active pen.

The active pen may radiate a pen pulse signal generated based on a first panel-driving pulse signal supplied to the panel and wirelessly transmit pen identification information through an embedded pen wireless communication unit.

The display may include a touch-sensing circuit configured to supply a first panel-driving pulse signal to the panel and output raw data read from the panel, to which the pen pulse signal is radiated, a wireless communication module configured to receive and output the pen identification information wirelessly transmitted from the active pen, and a touch controller configured to perform pen recognition processing based on the raw data output from the touch-sensing circuit and the pen identification information output from the wireless communication module.

The pen pulse signal radiated from the active pen may not include the pen identification information.

The pen pulse signal radiated from the active pen may include the pen identification information.

The active pen may wirelessly transmit pen data in addition to the pen identification information through the embedded pen wireless communication unit.

BRIEF DESCRIPTION OF THE DRAWINGS

The above and other features and advantages of the present disclosure will be more apparent from the following detailed description taken in conjunction with the accompanying drawings, in which:

FIGS. 12A and 12B illustrate examples of a touch process of a display device according to the present disclosure;

DETAILED DESCRIPTION

Figure 1:
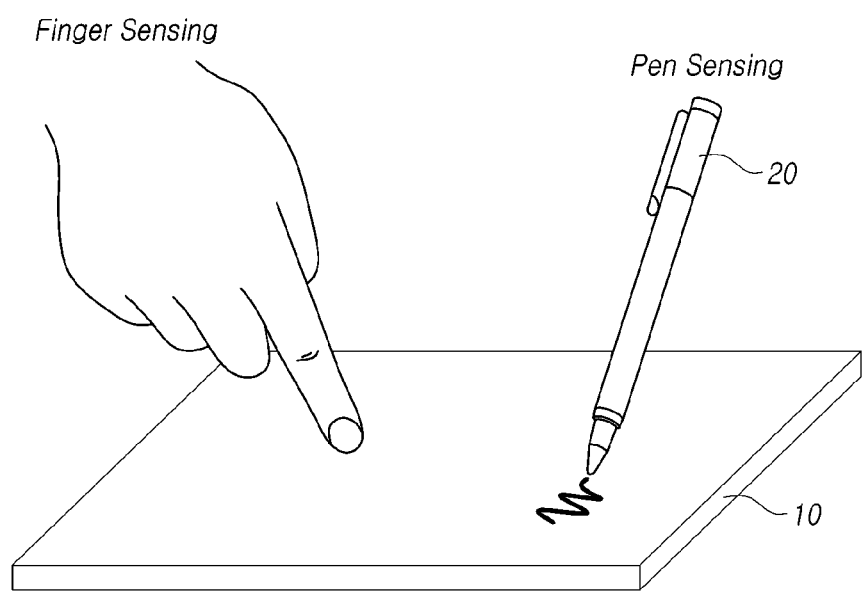
FIG. 1 illustrates a touch-sensing system according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
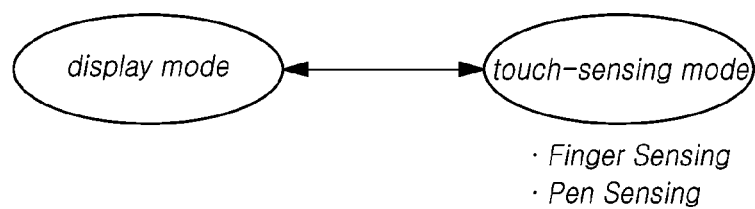
FIG. 2 illustrates an operation mode of a display device according to the present disclosure.

FIG. 1 illustrates a touch-sensing system according to the present disclosure, and FIG. 2 illustrates an operation mode of a display device 10 according to the present disclosure.

The touch-sensing system according to the present disclosure includes an active pen 20 and the display device 10 for processing pen recognition through a link with the active pen 20.

The display device 10 may have a display mode for displaying an image and a touch-sensing mode for sensing a touch.

The display device 10 may sense not only a touch by a finger but also a touch by the active pen 20 in the touch-sensing mode.

The display device 10 may link with the active pen 20 and sense the touch by the active pen 20.

The active pen 20 is a pen that includes an electrical component and performs an active operation of linking with the display device 10 in connection with the touch sensing.

In addition to the touch sensing by the active pen 20, the display device 10 may sense a touch by a passive pen that merely acts as a capacitor, like a finger, without an operation of actively linking with the display device 10. However, the touch by the passive pen is processed in the same manner as the touch by the finger. Accordingly, in this application, the touch by the finger includes the touch by the passive pen.

The present disclosure provides a pen recognition method by which the display device 10 may efficiently recognize the active pen 20 and simultaneously recognize many active pens 20.

According to the present disclosure, the active pen 20 may provide pen identification information to the display device 10 through a predetermined path (at least one of a wireless communication path and a path through a panel), so that it is possible to perform rapid and accurate pen recognition and also distinguishably recognize multiple active pens 20 so as to simultaneously process pen inputs made through the multiple active pens 20.

First, disclosure in which the active pen 20 provides pen identification information to the display device 10 through a panel in the form of a radiated signal will be described.

Figure 3:
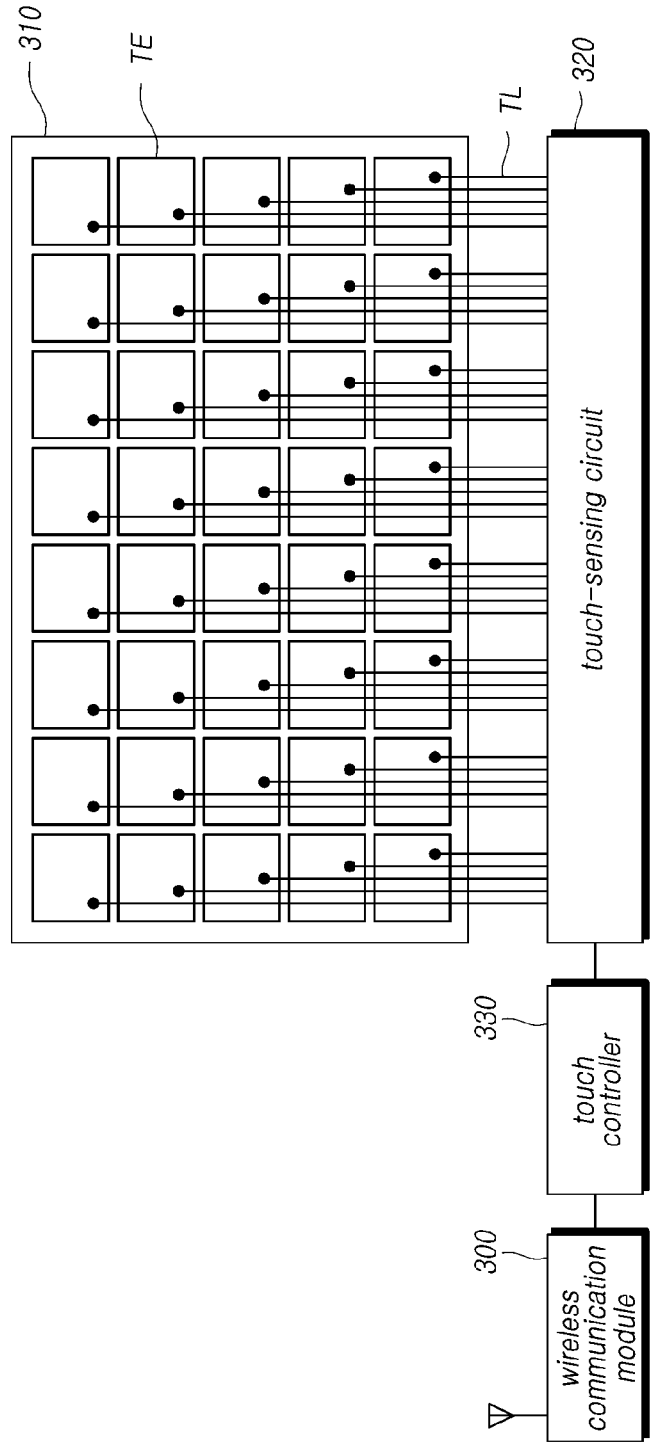
FIG. 3 is a block diagram illustrating a display device according to the present disclosure.

The display device 10 supplies a first panel-driving pulse signal to a panel 310 (shown in FIG. 3). Accordingly, the active pen 20 radiates a pen pulse signal (PENS) indicating pen identification information to the panel of the display device 10 through a pen tip 410 (shown in FIG. 4) based on the first panel-driving pulse signal supplied to the panel 310.

Further, the active pen 20 wirelessly transmits pen data to the display device 10. At this time, the active pen 20 wirelessly and additionally transmits pen identification information to the display device 10.

The display device 10 generates raw data read from the panel, to which the pen pulse signal has been radiated.

The display device 10 receives the pen data wirelessly transmitted from the active pen 20.

(11/28) The display device 10 may acquire the pen identification information from the generated raw data and perform pen recognition processing based on the acquired pen identification information and the wirelessly received pen data.

The pen recognition according to the present aspects may mean that the display device 10 recognizes the presence of the active pen 20 (that is, the generation of a touch by the active pen 20) and may further mean that the display device 10 recognizes pen identification information of the active pen 20.

Further, based on the pen recognition according to the present aspects, the recognition of the active pen 20 by the display device 10 may further mean that the display device 10 detects a location (pen location) of the touch made by the active pen 20.

In addition, based on the pen recognition according to the present aspects, the recognition of the active pen 20 by the display device 10 may further mean that the display device 10 recognizes additional pen information such as writing pressure or the inclination of the active pen 20.

Meanwhile, in the case in which the finger or the active pen 20 contacts the panel, the display device 10 according to the present aspects may sense the same as a touch. Further, in the case in which the finger or the active pen 20 is in proximity to the panel within a predetermined range or closer without contacting the panel, the display device 10 may sense the same as a touch. That is, the display device 10 according to the present aspects may provide both contact-type touch sensing and non-contact-type touch sensing (touch sensing through hovering).

Hereinafter, a pen recognition method according to the present aspects will be described in detail.

FIG. 3 is a diagram illustrating the display device 10 according to the present aspects.

Referring to FIG. 3, the display device 10 according to the present aspects is a device for linking with the active pen 20 and performing pen recognition processing, and may include a panel 310, a touch-sensing circuit 320, a touch controller 330, and a wireless communication module 300.

On the panel 310, a plurality of touch electrodes (TEs) may be arranged and a plurality of touch lines (TLs) for electrically connecting the plurality of touch electrodes (TEs) and the touch-sensing circuit 320 may be arranged.

The touch-sensing circuit 320 supplies a first panel-driving pulse signal (LFD) to all or some of the plurality of touch electrodes (TEs) arranged on the panel 310 and generates raw data (also referred to as sensing data) containing a read value that is read through each touch electrode (TE).

The touch-sensing circuit 320 may include, for example, a preamplifier for receiving the first panel-driving pulse signal (LFD) to supply the received first panel-driving pulse signal (LFD) to the panel 310 and receiving a signal from the panel 310 to output the received signal, at least one sensing unit including an integrator for integrating and outputting the signal output from the preamplifier, and an analog-to-digital converter for converting the signal output from the integrator within at least one sensing unit into a digital value and outputting a read value corresponding to the digital value.

The touch-sensing circuit 320 may further include a multiplexer circuit for making a selective electrical connection between at least one sensing unit and the plurality of touch lines (TLs) arranged on the panel 310. The touch-sensing circuit 320 may further include a multiplexer circuit for making a selective electrical connection between at least one sensing unit and the analog-to-digital converter.

Here, the read value that is read through each touch electrode (TE) may include information corresponding to capacitance formed between each touch electrode (TE) and the active pen 20 or a change in the capacitance, or information corresponding to capacitance formed between each touch electrode (TE) and the finger or a change in the capacitance.

The read value may vary depending on each touch electrode (TE). That is, the size of the read value may vary depending on how close the finger or the active pen 20 is to the corresponding touch electrode (TE).

The raw data (containing read values) generated by the touch-sensing circuit 320 may be transmitted to the touch controller 330 through an interface between the touch-sensing circuit 320 and the touch controller 330. Here, the interface between the touch-sensing circuit 320 and the touch controller 330 may be, for example, a Serial Peripheral Interface (SPI).

The touch controller 330 may sense the presence or absence of the touch by the finger or the active pen 20 based on the raw data generated by the touch-sensing circuit 320, or may sense a touch location.

The wireless communication module 300 is an element for performing wireless communication with the active pen 20, and may be a short-range wireless communication module using Bluetooth, Near-Field Communication (NFC), Radio-Frequency Identification (RFID), or direct Wi-Fi, or a wireless communication module, such as one using Wi-Fi, or may further include a mobile communication module, such as one using Long Term Evolution (LTE). The wireless communication module 300 may be a small and low-power communication module.

Figure 4:
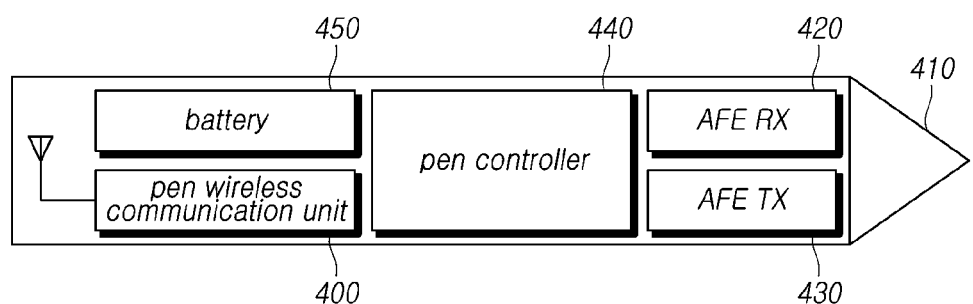
FIG. 4 is a block diagram illustrating an active pen according to the present disclosure.

FIG. 4 is a block diagram illustrating the active pen 20 according to the present aspects.

Referring to FIG. 4, the active pen 20 according to the present aspects may include a pen tip 410 that is in contact with or in proximity to the panel 310 of the display device 10, an analog front-end receiver (AFE RX) 420 for receiving a signal through the pen tip 410, an analog front-end transmitter (AFE TX) 430 for radiating a signal through the pen tip 410, a pen wireless communication unit 400, a battery 450, and a pen controller 440 for generating a signal, controlling signal transmission/reception, and controlling the overall function.

The pen wireless communication unit 400 is an element for performing wireless communication with the wireless communication module 300 of the display device 10, and may be a short-range wireless communication module using Bluetooth, Near-Field Communication (NFC), Radio-Frequency Identification (RFID), or direct Wi-Fi, or a wireless communication module, such as one using Wi-Fi, or may further include a mobile communication module, such as one using Long Term Evolution (LTE).

Hereinafter, a pen recognition method by which the display device 10 may efficiently recognize the active pen 20 based on a link with the active pen 20 will be described.

Figure 5:
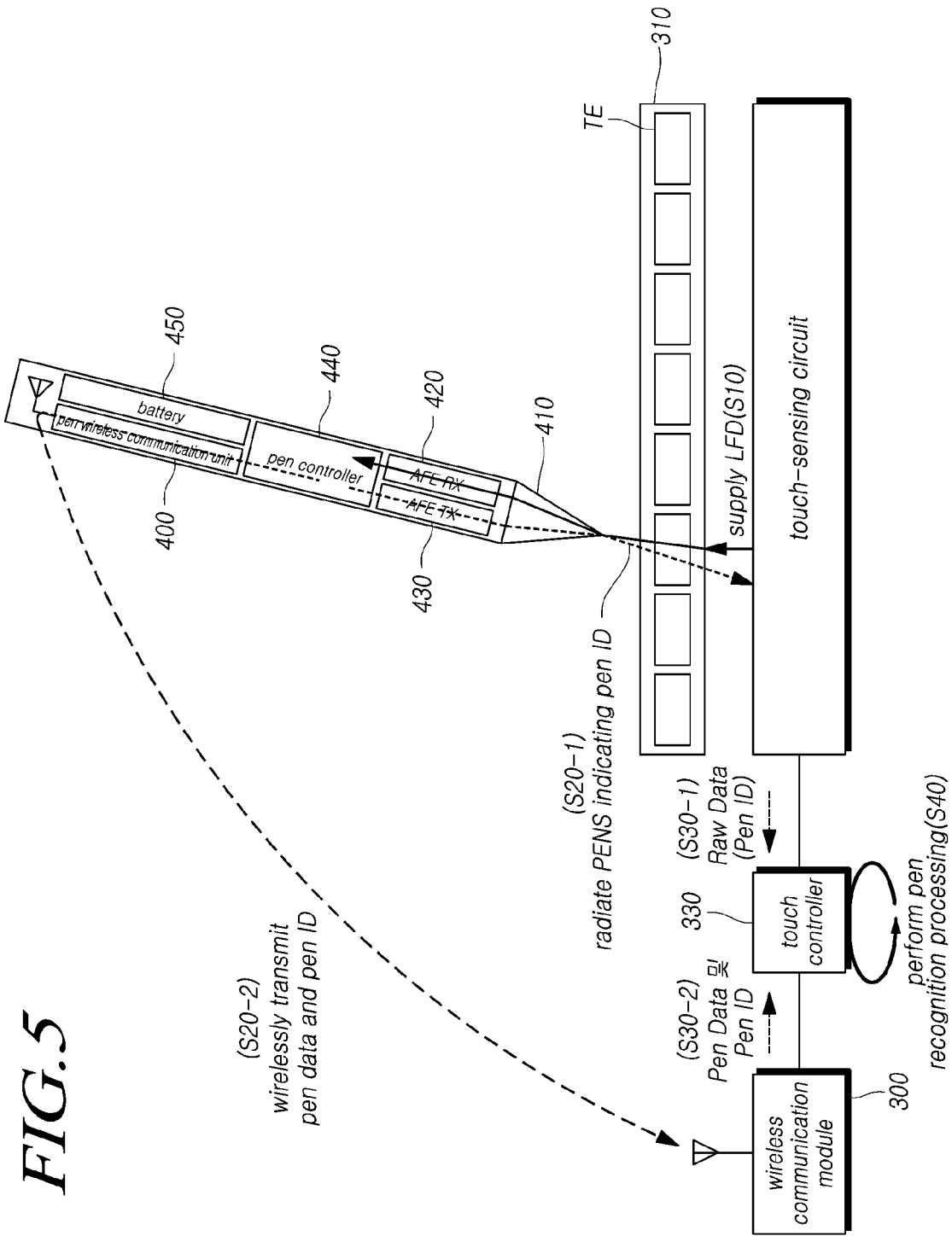
FIG. 5 illustrates a pen recognition process according to the present disclosure.

FIG. 5 illustrates a pen recognition process according to the present aspects.

Figure 6:
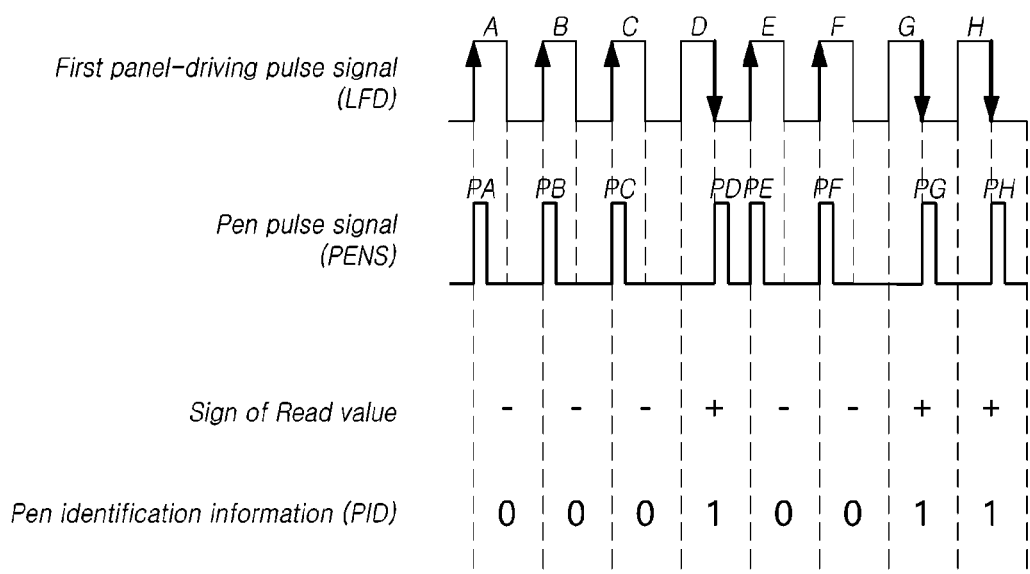
FIG. 6 illustrates a first panel-driving pulse signal supplied to a panel, a pen pulse signal radiated from an active pen, a read value generated by reading the pen pulse signal from a touch-sensing circuit, and pen identification information according to a sign of the read value according to the present disclosure.

FIG. 6 illustrates a first panel-driving pulse signal (LFD) supplied to the panel 310, a pen pulse signal (PENS) radiated from the active pen 20, a read value generated by reading the pen pulse signal (PENS) from the touch-sensing circuit 320, and pen identification information according to a sign of the read value in the touch-sensing system according to the present aspects.

Figure 7:
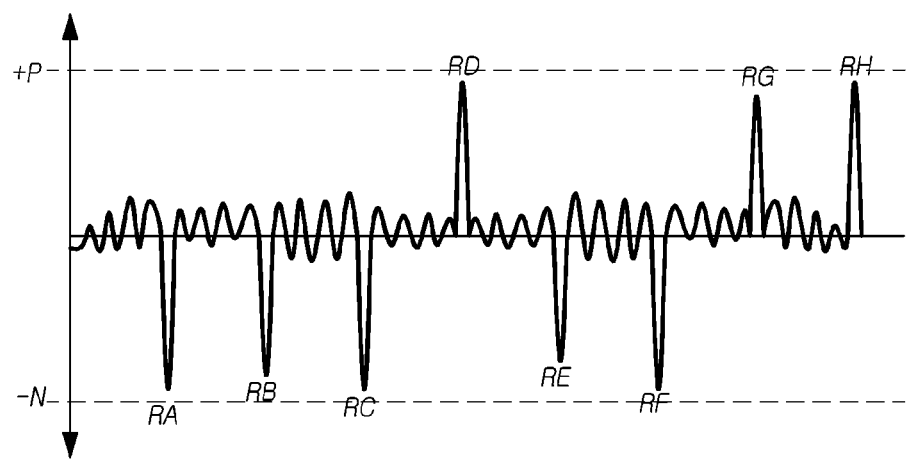
FIG. 7 illustrates raw data acquired through reading a panel by a touch-sensing circuit of a display device according to the present disclosure.

FIG. 7 illustrates raw data acquired by reading the panel 310 by the touch-sensing circuit 320 of the display device 10 according to the present aspects.

The touch-sensing circuit 320 supplies the first panel-driving pulse signal (LFD) to the panel 310. Accordingly, the analog front-end receiver 420 of the active pen 20 receives the first panel-driving pulse signal (LFD) supplied to the panel 310 through the pen tip 410 in S10.

The analog front-end transmitter 430 of the active pen 20 radiates the pen pulse signal (PENS) indicating pen identification information (pen ID) to the panel 310 through the pen tip 410 based on the first panel-driving pulse signal (LFD) in S20-1.

Further, the pen wireless communication unit 400 of the active pen 20 may wirelessly transmit pen data containing one or more pieces of pen-related additional information in S20-2.

The touch-sensing circuit 320 may generate raw data containing the read values generated by reading, through the panel 310, the pen pulse signal (PENS) indicating the pen identification information and output the generated raw data to the touch controller 330 in S30-1.

The wireless communication module 300 may receive the pen data wirelessly transmitted from the active pen 20 and output the pen data to the touch controller 330 in S30-2.

The touch controller 330 may acquire pen identification information (pen ID) from the raw data output from the touch-sensing circuit 320 and perform pen recognition processing based on the acquired pen identification information and the pen data output from the wireless communication module 300 in S40.

More specifically, through the pen recognition processing, the touch controller 330 may acquire pen identification information (pen ID) from the raw data output from the touch-sensing circuit 320 and sense a touch location (pen location) of the active pen 20 corresponding to the acquired pen identification information.

Further, through the pen recognition processing, the touch controller 330 may further recognize additional pen information of the active pen 20 based on the pen data output from the wireless communication module 300.

Here, the pen data may contain one or more pieces of additional pen information, such as a writing pressure, a pen inclination, control information, and button input information.

Further, the touch controller 330 may sense a touch location of the finger (finger location) based on the raw data output from the touch-sensing circuit 320.

As described above, the display device 10 acquires the pen identification information of the active pen 20 through the panel 310 and acquires the pen data of the active pen 20 through a wireless communication path. That is, the display device 10 may acquire information required for pen recognition (pen identification information and pen data) through two paths.

Accordingly, the active pen 20 may transmit the pen data and the pen identification information, which is a large amount of data, to the display device 10 through two different respective paths. Therefore, the display device 10 may rapidly and accurately acquire information required for pen recognition processing (additional pen information within pen data, and pen identification information), thereby rapidly and accurately performing pen recognition processing.

Further, as the active pen 20 transmits the pen identification information to the display device 10, the display device 10 may distinguish between a plurality of active pens 20 and may thus provide multi-pen recognition.

Referring to FIG. 5, the active pen 20 may further wirelessly transmit pen identification information (pen ID) as well as pen data containing one or more of a writing pressure, a pen inclination, and control information through the pen wireless communication unit 400.

Accordingly, the wireless communication module 300 of the display device 10 receives the pen identification information and the pen data and outputs the received pen identification information and pen data to the touch controller 330 in S30-2.

The touch controller 330 may perform pen recognition processing based on the raw data output from the touch-sensing circuit 320, the pen data, and the pen identification information output from the wireless communication module 300 in S40.

As described above, the pen identification information (pen ID) may be transmitted to the touch controller 330 through the panel 310, or may be transmitted to the touch controller 330 through a wireless transmission scheme. That is, the touch controller 330 may acquire the pen identification information (pen ID) through two paths.

As described above, as the active pen 20 transmits the pen identification information, which is important for pen recognition (particularly multi-pen recognition), to the display device 10 through two different respective paths, the touch controller 330 may reliably acquire the pen identification information, which is important information that makes multi-pen recognition possible. Accordingly, the display device 10 may more accurately recognize the active pen 20, and may accurately distinguish between two or more active pens 20 and simultaneously provide pen recognition processing thereof. Accordingly, the user may perform touch, writing, or input by simultaneously using two or more active pens 20.

Referring to FIG. 6, a first panel-driving pulse signal (LFD) is a signal for driving the panel 310 to sense the touch by the finger or the active pen 20, that is, the signal that the touch-sensing circuit 320 supplies to the panel 310.

The first panel-driving pulse signal (LFD) may include a plurality of panel-driving pulses A, B, C, D, E, F, G, and H.

The active pen 20 receives the first panel-driving pulse signal (LFD) supplied to the panel 310 through the pen tip 410 and generates a pen pulse signal (PENS) based on the received first panel-driving pulse signal (LFD).

The pen pulse signal (PENS) is a signal that allows the display device 10 to recognize the active pen 20, that is, a signal that the active pen 20 radiates to the panel 310 of the display device 10.

The active pen 20 generates the pen pulse signal (PENS) based on the first panel-driving pulse signal (LFD).

The pen pulse signal (PENS) may include a plurality of pen pulses PA, PB, PC, PD, PE, PF, PG, and PH indicating a plurality of digital codes (for example, 0, 0, 0, 1, 0, 0, 1, 1) corresponding to pen identification information based on the first panel-driving pulse signal (LFD).

The plurality of pen pulses PA, PB, PC, PD, PE, PF, PG, and PH included in the pen pulse signal (PENS) may include first pen pulses (for example, PA, PB, PC, PE, and PF) indicating a first digital code (for example, 0 or 1) and second pen pulses (for example, PD, PG, and PH) indicating a second digital code (for example, 1 or 0).

The first pen pulses (for example, PA, PB, PC, PE, and PF) are pulsed at rising time of corresponding panel-driving pulses (for example, A, B, C, E, and F) among the plurality of panel-driving pulses A, B, C, D, E, F, G, and H included in the first panel-driving pulse signals (LFD).

The second pen pulses (for example, PD, PG, and PH) are pulsed at falling time of corresponding panel-driving pulses (for example, D, G, and F) among the plurality of panel-driving pulses A, B, C, D, E, F, G, and H included in the first panel-driving pulse signals (LFD).

As described above, since the active pen 20 generates the pen pulse signal (PENS) indicating the pen identification information (PID) based on the first panel-driving pulse signal (LFD) and radiates the generated pen pulse signal (PENS) to the panel 310, the display device 10 may accurately read the pen pulse signal (PENS) and accurately recognize the pen identification information (PID) indicated by the pen pulse signal (PENS).

As illustrated in FIGS. 6 and 7, the raw data read from the panel 310 by the touch-sensing circuit 320 may include a plurality of read values (for example, RA, RB, RC, RD, RE, RF, RG, and RH) having a real number within a range greater than or equal to −N (N is a preset positive real number) and less than or equal to +P (P is a preset positive real number).

The plurality of read values may include first read values (for example, RA, RB, RC, RE, and RF) for the first pen pulses (for example, PA, PB, PC, PE, and PF) and second read values (for example, RD, RG, and RH) for the second pen pulses (for example, PD, PG, and PH), and the signs of the first read values (RA, RB, RC, RE, and RF) may be different from the signs of the second read values (for example, RD, RG, and RH).

For example, when a phase relationship between the plurality of panel-driving pulses A, B, C, D, E, F, G, and H included in the first panel-driving pulse signal (LFD) and the plurality of pen pulses (PA, PB, PC, PD, PE, PF, PG, and PH) included in the pen pulse signal (PENS) is an in-phase relationship, the corresponding first read values (for example, RA, RB, RC, RE, and RF) have a real negative (−) value.

In this case, the touch controller 330 may determine that the corresponding first read values (for example, RA, RB, RC, RE, and RF) having the real negative (−) value correspond to the first digital code (for example, 0).

When a phase relationship between the plurality of panel-driving pulses A, B, C, D, E, F, G, and H included in the first panel-driving pulse signal (LFD) and the plurality of pen pulses (PA, PB, PC, PD, PE, PF, PG, and PH) included in the pen pulse signal (PENS) is an out-of-phase relationship, the corresponding second read values (for example, RD, RG, and RH) have a positive (+) real number.

In this case, the touch controller 330 may determine that the corresponding second read values (for example, RD, RG, and RH) having the positive (+) real number correspond to the second digital code (for example, 1).

Accordingly, the touch controller 330 may determine a plurality of digital codes (for example, 00010011) based on the sign of each of the plurality of read values (for example, RA, RB, RC, RD, RE, RF, RG, and RH) included in the raw data read from the panel 310 by the touch-sensing circuit 320 and acquire the pen identification information (PID) including the plurality of determined digital codes (for example, 00010011).

As described above, it is possible to easily and accurately acquire the pen identification information (PID) of the active pen 20 based on the read values (for example, RA, RB, RC, RD, RE, RF, RG, and RH) included in the raw data read from the panel 310 by the touch-sensing circuit 320.

Meanwhile, as illustrated in FIG. 7, the raw data read from the panel 310 by the touch-sensing circuit 320 may include a plurality of read values (for example, RA, RB, RC, RD, RE, RF, RG, and RH) having real numbers within a range greater than or equal to −N (where N is a preset positive real number) and less than or equal to +P (where P is a preset positive real number).

For example, the raw data may include a plurality of read values (for example, RA, RB, RC, RD, RE, RF, RG, and RH) having a real number within a range greater than or equal to −1 and less than or equal to +1.

The touch controller 330 may detect a location of the active pen 20 or the finger or the presence or absence of the touch based on the distribution of all or some of the plurality of read values (for example, RA, RB, RC, RD, RE, RF, RG, and RH) on the panel 310.

That is, the touch controller 330 may calculate the distribution of the read values (i.e. the distribution of the sizes of the read values at each panel location) having the real number based on the received and collected raw data, and when a distribution appears such that read values are significantly different at a particular location based on the calculated distribution, the particular location may be detected to indicate the presence or absence of the touch by the finger or the active pen 20 and/or the touch location.

As described above, the touch controller 330 may acquire the pen identification information (PID) of the active pen 20 based on the raw data read from the panel 310 by the touch-sensing circuit 320 and may also detect the touch location of the active pen 20. In some cases, the touch controller 330 may detect the presence or absence of the touch by the finger and/or the touch location.

The panel 310 of the display device 10 according to the present aspects may be a touch screen panel dedicated for touch sensing or, in some cases, may be a display panel serving as the touch screen panel.

Figure 8:
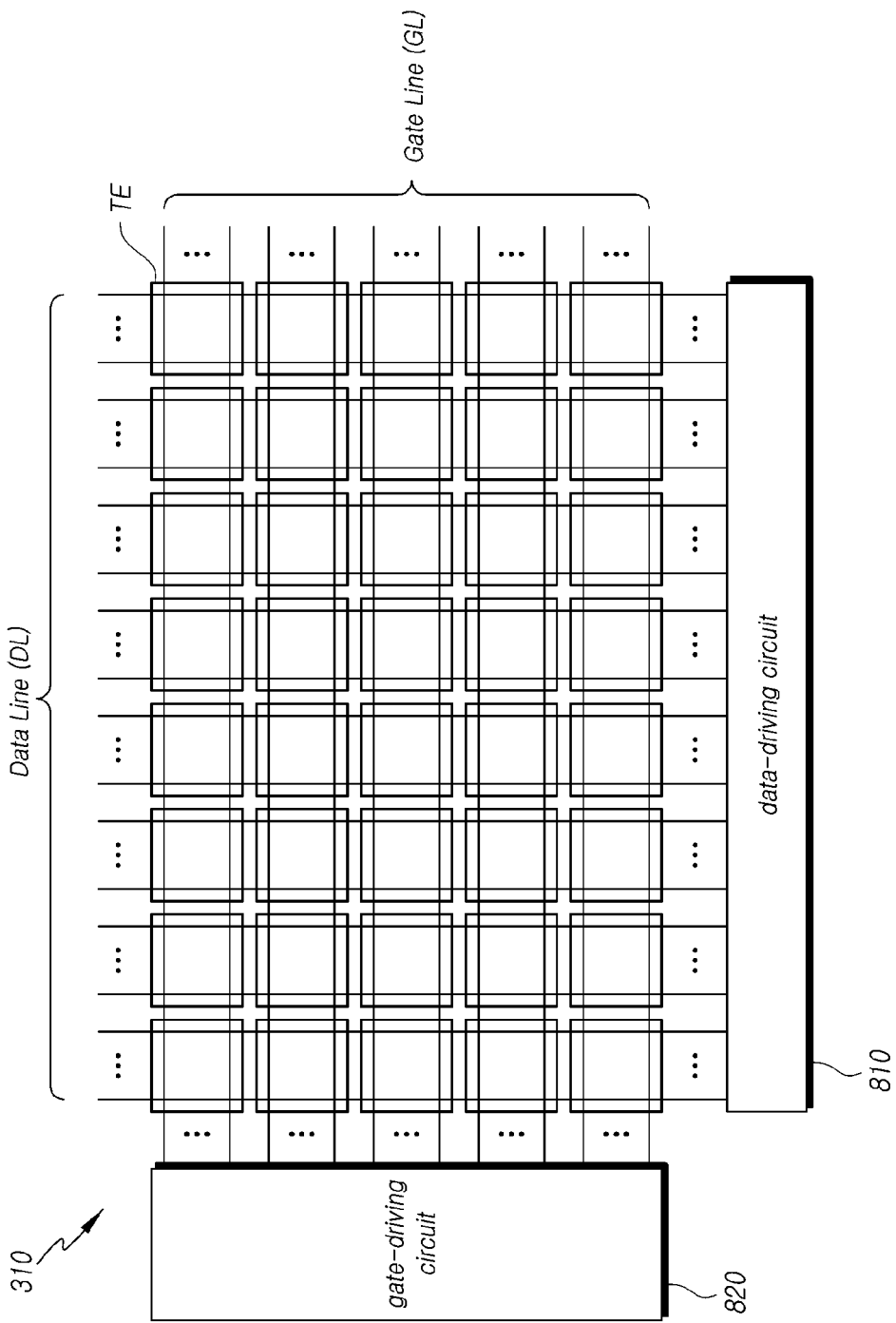
FIG. 8 illustrates display-driving elements in the case in which a panel of a display device is a display panel including a touch screen panel therein according to the present disclosure.

FIG. 8 illustrates display-driving elements in the case in which the panel 310 of the display device 10 according to the present aspects is a display panel including a touch screen panel therein.

Referring to FIG. 8, when the panel 310 of the display device 10 according to the present aspects is a display panel including a touch screen panel therein, a plurality of data lines (DLs) in a first direction (for example, a column direction), a plurality of gate lines (GLs) in a second direction (for example, a row direction), and a plurality of touch electrodes (TEs) for touch sensing may be arranged on the panel 310. Here, the panel 310 including the touch screen panel therein means that a plurality of touch electrodes (TEs) is embedded into and arranged on the panel 310.

Referring to FIG. 8, the display device 10 according to the present aspects may include a data-driving circuit 810 for driving a plurality of data lines (DLs) and a gate-driving circuit 820 for driving a plurality of gate lines (GLs).

In some cases, the display device 10 according to the present aspects may further include a control element, such as a timing controller for controlling the data-driving circuit 810 and the gate-driving circuit 820.

The data-driving circuit 810 and the touch-sensing circuit 320 may be combined into and implemented as a single integrated circuit.

Further, two or more of the data-driving circuit 810, the gate-driving circuit 820, the timing controller, the touch-sensing circuit 320, and the touch controller 330 may be combined into and implemented as a single integrated circuit.

Figure 9:
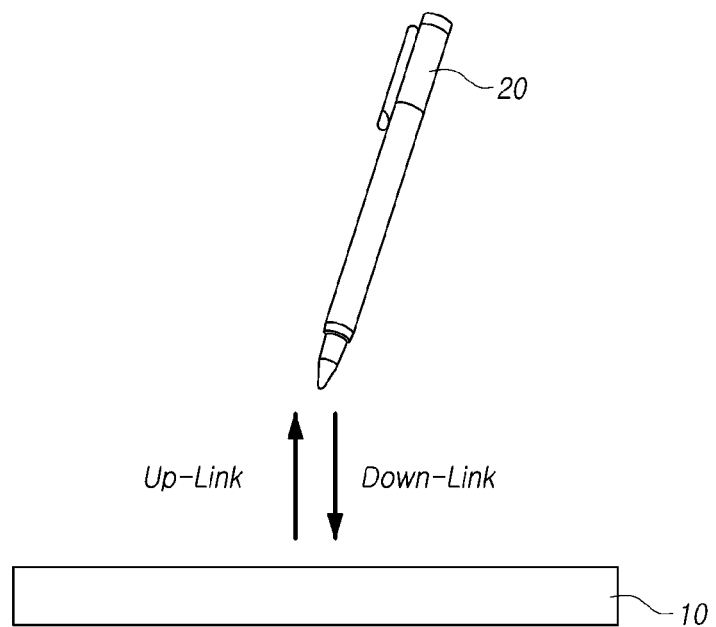
FIG. 9 illustrates an uplink and a downlink between a display device and an active pen according to the present disclosure.

FIG. 9 illustrates an uplink and a downlink between the display device 10 and the active pen 20 according to the present aspects.

Referring to FIG. 9, the display device 10 and the active pen 20 according to the present aspects transmit and receive a signal for pen recognition.

When the display device 10 transmits a signal (including all types of data and information) to the active pen 20, an uplink exists between the display device 10 and the active pen 20.

When the pen 20 transmits a signal (including all types of data and information) to the display device 10, a downlink exists between the display device 10 and the active pen 20.

Figure 10:
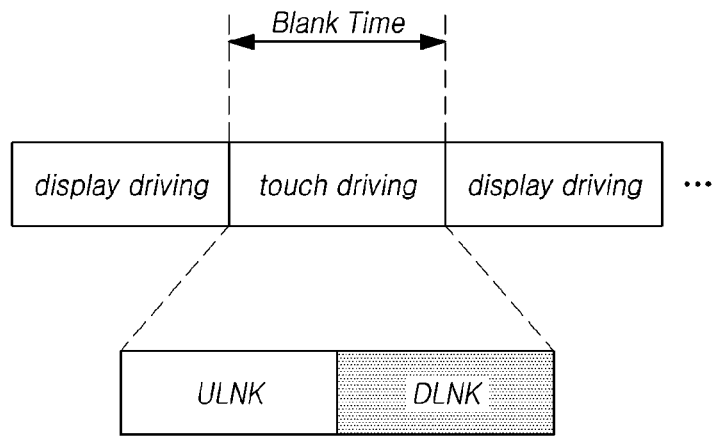
FIG. 10 illustrates operation sections of a display device according to the present disclosure.
Figure 11:
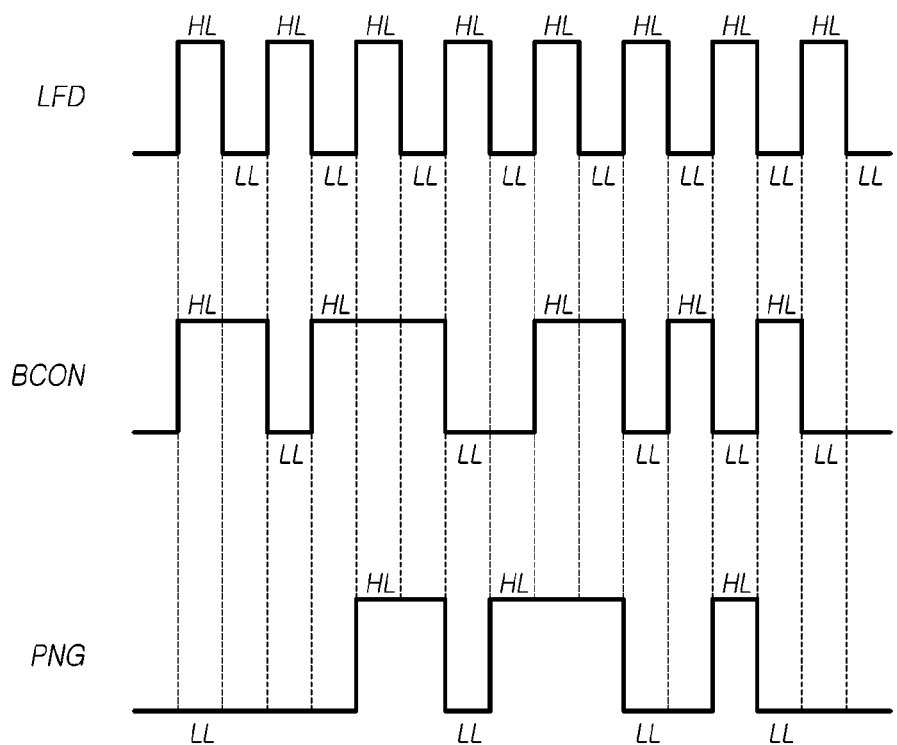
FIG. 11 illustrates three panel-driving pulse signals supplied to panel of a display device according to the present disclosure.

FIG. 10 illustrates operation sections of the display device 10 according to the present aspects, and FIG. 11 illustrates three panel-driving pulse signals supplied to the panel 310 of the display device 10 according to the present aspects.

Referring to FIG. 10, the operation sections of the display device 10 may include a display-driving section and a touch-driving section.

In other words, the display device 10 may alternately perform display driving and touch driving.

The touch-driving section may correspond to a blank time between two display-driving sections.

Panel-driving statuses in the display-driving section and the touch-driving section will now be described.

In the display-driving section, an image data signal is applied to a plurality of data lines (DLs) and a gate signal is applied to a plurality of gate lines (GLs) on the panel 310.

The touch-driving section, corresponding to the blank section between the two display-driving sections, may include an uplink transmission section (ULNK) for transmitting a signal from the display device 10 to the active pen 20 and a downlink transmission section (DLNK) for transmitting a signal from the active pen 20 to the display device 10.

In the downlink transmission section (DLNK), a first panel-driving pulse signal (LFD) may be applied to all or some of a plurality of touch electrodes (TEs) on the panel 310.

In the uplink transmission section (ULNK), a second panel-driving pulse signal (BCON) or a third panel-driving pulse signal (PNG) may be applied to all or some of a plurality of touch electrodes (TEs) on the panel 310.

Here, the second panel-driving pulse signal (BCON) or the third panel-driving pulse signal (PNG) is a signal distinguished from the first panel-driving pulse signal (LFD).

Signal transmission/reception between the display device 10 and the active pen 20 in each of the uplink transmission section (ULNK) and the downlink transmission section (DLNK), into which the touch-driving section is divided, will be described below.

In the downlink transmission section (DLNK), the panel status is a status in which the first panel-driving pulse signal (LFD) is supplied to the panel 310. Accordingly, the first panel-driving pulse signal (LFD) supplied to the panel 310 is input into the active pen 20.

In the downlink transmission section (DLNK), the pen pulse signal (PENS), indicating pen identification information, is radiated to the panel 310 from the active pen 20.

Further, in the downlink transmission section (DLNK), pen identification information and pen data are wirelessly transmitted to the wireless communication module 300 from the active pen 20.

Accordingly, in the downlink transmission section (DLNK), a finger location (FLOC) at which the touch by the finger is performed may be detected, a pen location (PLOC) at which the touch by the active pen 20 is performed may be detected, and pen identification information (PID) of the active pen 20 may be detected.

In the uplink transmission section (ULNK), the panel status is a status in which the second panel-driving pulse signal (BCON) or the third panel-driving pulse is supplied to the panel 310.

Accordingly, the second panel-driving pulse signal (BCON) or the third panel-driving pulse supplied to the panel 310 may be input into the active pen 20 from the panel 310.

The second panel-driving pulse signal (BCON) or the third panel-driving pulse signal supplied to the panel 310 and transmitted to the active pen 20 in the uplink transmission section (ULNK) may be distinguished from the first panel-driving pulse signal (LFD) supplied to the panel 310 and transmitted to the active pen 20 in the downlink transmission section (DLNK).

As described above, by dividing the touch-driving section into the uplink transmission section (ULNK) and the downlink transmission section (DLNK), it is possible to realize a proper panel-driving state required for pen recognition with respect to each of the uplink transmission section (ULNK) and the downlink transmission section (DLNK). Accordingly, efficient and accurate signal transmission/reception for pen recognition is possible, and as a result, accurate and efficient pen recognition is possible.

Referring to FIG. 11, as described above, in order to detect the touch (finger or pen), the three panel-driving pulse signals (LFD, BCON, and PNG) may be supplied to the panel 310.

First, the first panel-driving pulse signal (LFD) is a signal supplied to the panel 310 and transmitted to the active pen 20 in the downlink transmission section (DLNK), that is, a signal having a periodic pattern in which a high-level section (HL) and a low-level section (LL) alternate.

The active pen 20 may generate a pen pulse signal (PENS) indicating pen identification information at pulse timing of the first panel-driving pulse signal (LFD) and radiate the generated pen pulse signal (PENS) to the panel 310.

The first panel-driving pulse signal (LFD) merely swings alternately in the high-level section (HL) and the low-level section (LL), but no meaningful information is carried thereon.

On the other hand, the second panel-driving pulse signal (BCON) and the third panel-driving pulse signal (PNG) are signals that carry meaningful information.

The second panel-driving pulse signal (BCON) is a signal supplied to the panel 310 and transmitted to the active pen 20 in the uplink transmission section (ULNK), that is, a beacon signal carrying panel information.

As the active pen 20 receives the second panel-driving pulse signal (BCON), which is the beacon signal, the active pen 20 may recognize that the panel 310 is in proximity to the active pen 20 and be made aware of panel information of the recognized panel 310.

Here, the panel information may include panel identification information, a panel resolution, and a panel manufacturer.

The third panel-driving pulse signal (PNG) is a signal supplied to the panel 310 and transmitted to the active pen 20 in the uplink transmission section (ULNK), that is, a ping signal carrying touch-driving section information.

As the active pen 20 receives the third panel-driving pulse signal (PNG), which is the ping signal, the active pen 20 may operate based on synchronization with the driving operation of the display device 10 or the panel 310.

The active pen 20 may recognize the frame that the display device 10 is driving through the third panel-driving pulse signal (PNG), corresponding to the ping signal, and recognize a touch-driving section within the frame.

That is, the third panel-driving pulse signal (PNG) may temporally synchronize the operation between the display device 10 and the active pen 20.

The above-described first panel-driving pulse signal (LFD), second panel-driving pulse signal (BCON) and third panel-driving pulse signal (PNG) are distinguished from each other.

As described above, by applying different panel-driving pulse signals suitable for respective timing for touch sensing (finger sensing or pen sensing), the touch sensing may be accurately performed.

Meanwhile, the three panel-driving pulse signals (LFD, BOON, and PNG) may be basically supplied to all or some of the plurality of touch electrodes (TEs) arranged on the panel 310.

In this case, an unnecessary parasitic capacitor may be formed between the touch electrodes (TEs) and other electrodes within the panel 310.

The parasitic capacitor may be a factor that causes a Resistor-Capacitor (RC) delay for the touch electrodes (TEs) and deteriorates sensing accuracy in capacitance-based touch sensing.

Accordingly, in the downlink transmission section (DLNK) within the touch-driving section, a signal corresponding to the first panel-driving pulse signal (LFD) may be applied to all or some of the plurality of data lines (DLs).

Further, in the downlink transmission section (DLNK) within the touch-driving section, a signal corresponding to the first panel-driving pulse signal (LFD) may be applied to all or some of the plurality of gate lines (GLs).

Here, the signal corresponding to the first panel-driving pulse signal (LFD) may be a signal that is completely the same as or is substantially the same as the first panel-driving pulse signal (LFD) based on frequency, amplitude, phase, and other signal characteristics.

Meanwhile, the signal corresponding to the first panel-driving pulse signal (LFD) may be a signal that is completely the same as or substantially the same as the first panel-driving pulse signal (LFD) based on at least one of the frequency, amplitude, phase, and other signal characteristics.

Here, the term "substantially the same" means that two values are not exactly the same as each other, but they are considered to be the same when the difference therebetween is within a predetermined tolerance margin or a measurement error range. For example, the tolerance margin or the measurement error range may be ±20%, ±10%, ±5%, or ±1%.

As described above, in the downlink transmission section (DLNK) within the touch-driving section, a finger location (FLOC), at which the touch by the finger is performed, may be accurately detected, a pen location (PLOC), at which the touch by the active pen 20 is performed, may be accurately detected, and pen identification information (PID) of the active pen 20 may be accurately detected in the state in which the effect of the parasitic capacitor is removed or substantially removed.

Here, the term "substantial removal of the parasitic capacitor" may mean that the parasitic capacitor is considered to be removed when a change in touch-sensing accuracy attributable to the parasitic capacitor is within a predetermined tolerance margin (for example, ±20%, ±10%, ±5%, or ±1%) even if the parasitic capacitor is not completely removed.

Meanwhile, in the uplink transmission section (ULNK) within the touch-driving section, a signal corresponding to the second panel-driving pulse signal (BCON) may be applied to all or some of the plurality of data lines (DLs) while the second panel-driving pulse signal (BCON) is supplied to the panel 310.

Further, in the uplink transmission section (ULNK) within the touch-driving section, a signal corresponding to the second panel-driving pulse signal (BCON) may be applied to all or some of the plurality of gate lines (GLs) while the second panel-driving pulse signal (BCON) is supplied to the panel 310.

In the uplink transmission section (ULNK) within the touch-driving section, a signal corresponding to the third panel-driving pulse signal (PNG) may be applied to all or some of the plurality of data lines (DLs) while the third panel-driving pulse signal (PNG) is supplied to the panel 310.

Further, in the uplink transmission section (ULNK) within the touch-driving section, a signal corresponding to the third panel-driving pulse signal (PNG) may be applied to all or some of the plurality of gate lines (GLs) while the third panel-driving pulse signal (PNG) is supplied to the panel 310.

Here, the signal corresponding to the second panel-driving pulse signal (BCON) or the third panel-driving pulse signal (PNG) may be a signal that is completely the same as or substantially the same as the second panel-driving pulse signal (BCON) or the third panel-driving pulse signal (PNG) based on frequency, amplitude, phase, or other signal characteristics.

Meanwhile, the signal corresponding to the second panel-driving pulse signal (BCON) or the third panel-driving pulse signal (PNG) may be a signal that is completely the same as or substantially the same as the second panel-driving pulse signal (BCON) or the third panel-driving pulse signal (PNG) based on at least one of the frequency, amplitude, phase, or other signal characteristics.

Here, the term "substantially the same" means that two values are not exactly the same as each other, but they are considered to be the same when the difference therebetween is within a predetermined tolerance margin or measurement error range. For example, the tolerance margin or the measurement error range may be ±20%, ±10%, ±5%, or ±1%.

Meanwhile, the display device 10 according to the present aspects may proceed through one display-driving section during one frame section (display frame).

In this case, one frame section may include one display-driving section and one touch-driving section.

Alternatively, the display device 10 according to the present aspects may proceed through two or more display-driving sections during one frame section.

In this case, one frame section may include two or more display-driving sections and one or more touch-driving sections.

Figure 12A:
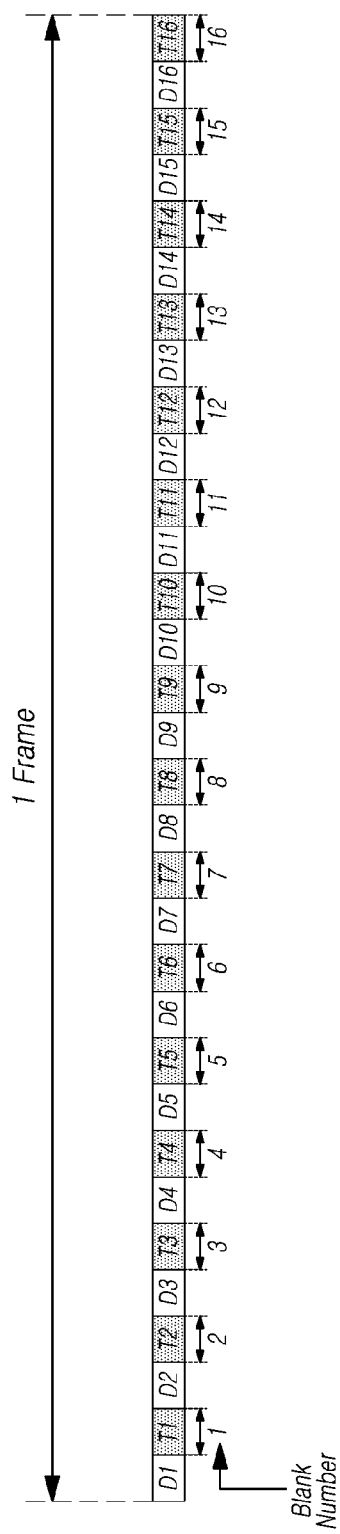

FIGS. 12A and 12B illustrate examples of a touch process of the display device 10 according to the present aspects.

Referring to FIG. 12A, for example, the display device 10 operates 16 display-driving sections D1, D2, . . . , D16, into which one frame section is divided, and operates touch-driving sections at every blank section 1 to 16, which are sections between two display-driving sections.

Accordingly, one frame section may be temporally divided into 16 display-driving sections D1, D2, . . . , D16 and 16 touch-driving sections T1, T2, . . . , T16, so that display driving and touch driving may alternate.

FIG. 12B illustrates a touch-sensing process for each of the 16 touch-driving sections T1, T2, . . . , T16 of FIG. 12A.

Referring to FIG. 12B, each of the 16 touch-driving sections T1, T2, . . . , T16 corresponding to the 16 blank sections 1, 2, . . . , 16 is divided into an uplink transmission section (ULNK) and a downlink transmission section (DLNK).

Referring to FIG. 12B, as described above, the first panel-driving pulse signal (LFD) is supplied, the finger location (FLOC) is detected, the pen location (PLOC) is detected, and the pen identification information (PID) is recognized in the downlink transmission section (DLNK).

Referring to FIG. 12B, as described above, in all or some of the 16 uplink transmission sections (ULNK), the second panel-driving pulse signal (BCON) may be supplied to the panel 310.

For example, in a first uplink transmission section (ULNK) and a middle uplink transmission section (ULNK) (that is, an eighth uplink transmission section) of the 16 uplink transmission sections (ULNK), the second panel-driving pulse signal (BCON) may be supplied to the panel 310.

Referring to FIG. 12B, as described above, in all or some of the 16 uplink transmission sections (ULNK), the third panel-driving pulse signal (PNG) may be supplied to the panel 310.

For example, in the uplink transmission section, in which the second panel-driving pulse signal (BCON) is supplied to the panel 310 among the 16 uplink transmission sections (ULNK), the third panel-driving pulse signal (PNG) may be supplied to the panel 310.

As described above, the active pen 20 includes the pen wireless communication unit 400 for wirelessly transmitting pen data and pen identification information, and the display device 10 includes the wireless communication module 300 for receiving the pen data and the pen identification information.

The pen wireless communication unit 400 of the active pen 20 and the wireless communication module 300 of the display device 10 may be, for example, a short-range wireless communication module using Bluetooth, Near-Field Communication (NFC), Radio-Frequency Identification (RFID), or direct Wi-Fi, or may communicate through a wireless communication scheme, such as Wi-Fi or Long-Term Evolution (LTE).

When the pen wireless communication unit 400 of the active pen 20 and the wireless communication module 300 of the display device 10 communicate through the short-range wireless communication scheme, such as Bluetooth, NFC, RFID, or direct Wi-Fi, they may detect each other and establish a connection therebetween through a pairing operation without any access point.

When the pen wireless communication unit 400 of the active pen 20 and the wireless communication module 300 of the display device 10 communicate through the wireless communication scheme, such as Wi-Fi or Long Term Evolution (LTE), they may detect each other and establish a connection therebetween through an access point, such as a router or a base station.

Accordingly, the active pen 20 and the display device 10 may provide a user interface for establishing the connection therebetween.

Figure 13:
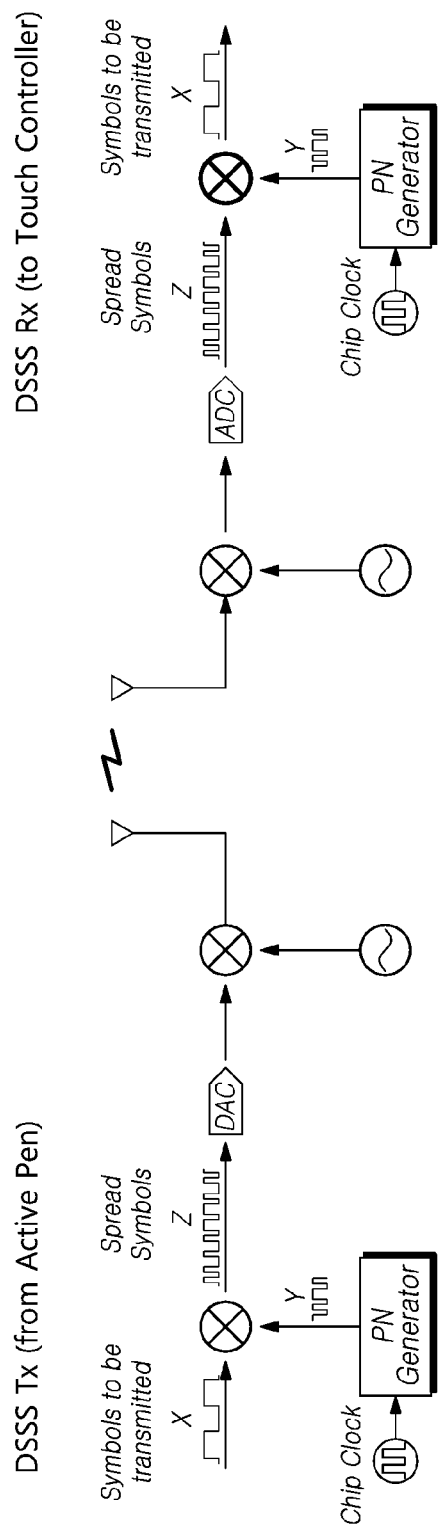
FIGS. 13 to 15 illustrate a wireless communication method between an active pen and a display device according to the present disclosure.
Figure 14:
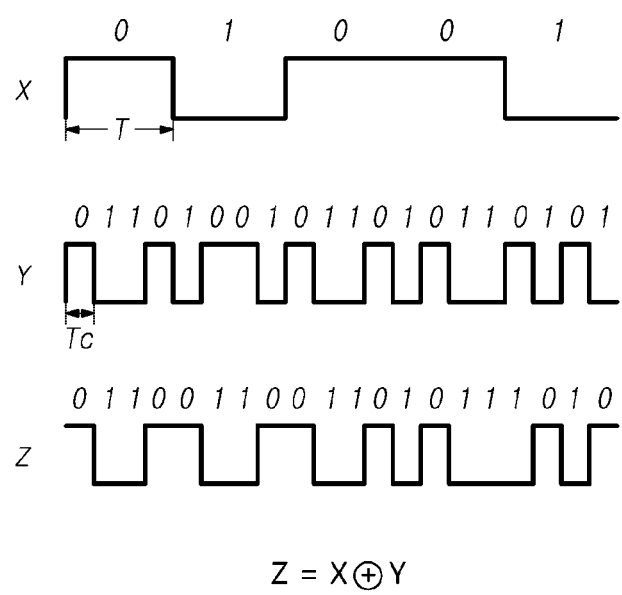
Figure 15:
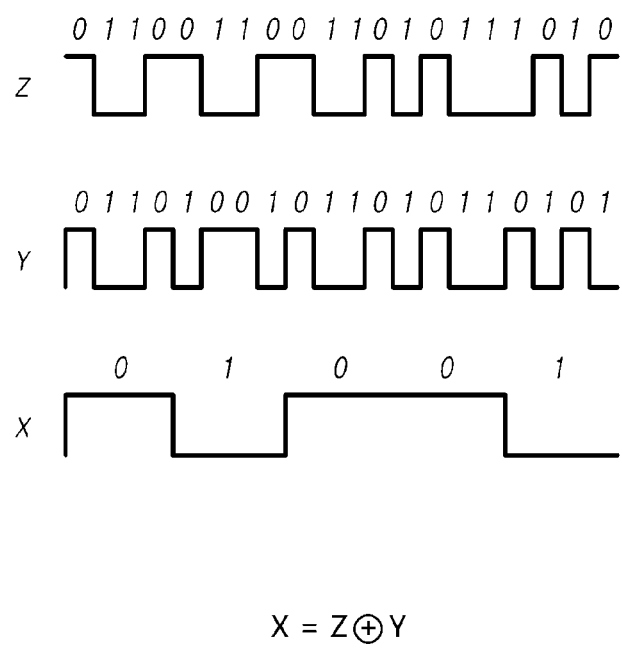

FIGS. 13 to 15 illustrate a wireless communication method between the active pen 20 and the display device 10 according to the present aspects.

In wireless communication between the pen wireless communication unit 400 of the active pen 20 and the wireless communication module 300 of the display device 10, they may transmit and receive a signal through a spread-spectrum scheme in order to remove signal interference attributable to noise and improve security.

That is, the wireless communication unit 400 of the active pen 20 may spectrum-spread a signal (X) including pen data and pen identification information to be transmitted through a Pseudo Noise (PN) code (Y) and wirelessly transmit a spectrum-spread signal (Z) to the wireless communication module 300 of the display device 10.

More specifically, the pen wireless communication unit 400 of the active pen 20 primarily modulates, for example, the pen data and the pen identification information to be transmitted through a Phase-Shift Keying (PSK) scheme and secondarily modulates the primarily modulated signal (X) through the PN code (Y) generated by a PN code generator so as to convert the secondarily modulated signal (Z) to an analog signal through a Digital-to-Analog Converter (DAC) and wirelessly transmit the analog signal through an antenna.

Here, the secondarily modulated signal (Z) may be made by performing an Exclusive-Or operation between the primarily modulated signal (X) and the PN code (Y).

Further, the PN code generator generates the PN code (Y) consisting of a plurality of bit sequences through a chip clock having a chip clock period (Tc).

The PN code (Y) used by the pen wireless communication unit 400 of the active pen 20 is equally used when demodulated by the wireless communication module 300 of the display device 10.

The wireless communication module 300 of the display device 10 may perform demodulation by inversely performing the scheme through which the pen wireless communication unit 400 of the active pen 20 performs modulation.

The wireless communication module 300 of the display device 10 converts the signal wirelessly received from the pen wireless communication unit 400 of the active pen 20 into a digital signal through the analog-to-digital converter, primarily modulates the converted digital signal (Z) based on the PN code (Y) generated by the PN code generator, and acquire pen data and pen identification information that the active pen 20 desires to transmit through a PSK demodulation process of the primarily demodulated signal (X).

Here, the primarily modulated signal (X) may be made by performing an Exclusive-Or operation between the digital signal (Z) converted from the received signal and the PN code (Y).

Further, the PN code generator within the wireless communication module 300 of the display device 10 generates a PN code (Y) that is the same as the PN code (Y) used by the pen wireless communication unit 400 of the active pen 20.

Meanwhile, the spread-spectrum scheme used in wireless communication between the pen wireless communication unit 400 of the active pen 20 and the wireless communication module 300 of the display device 10 may be, for example, a Direct-Sequence Spread-Spectrum (DSSS) scheme, a Frequency-Hopping Spread-Spectrum (FHSS) scheme, or a Time-Hopping Spread-Spectrum (THSS) scheme.

Further, the spread-spectrum scheme used in wireless communication between the pen wireless communication unit 400 of the active pen 20 and the wireless communication module 300 of the display device 10 may be a chirp modulation scheme, which is a spectrum spread for changing a carrier frequency based on a linear frequency characteristic in a temporal change section of an information signal, without relying on the PN code for spectrum spread.

As described above, the pen wireless communication unit 400 of the active pen 20 and the wireless communication module 300 of the display device 10 may accurately transmit and receive a signal carrying information to be transmitted without being influenced by noise, and may increase the security of information. Accordingly, it is possible to perform more accurate pen recognition.

Figure 16:
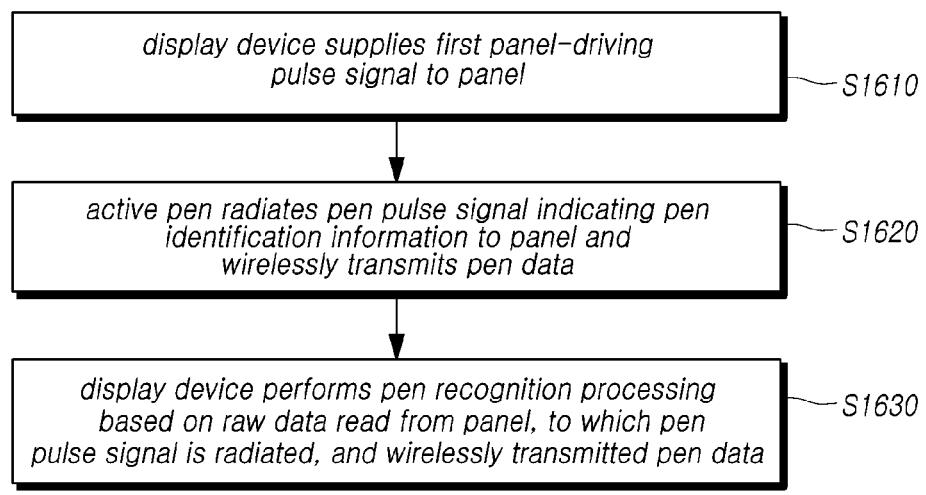
FIG. 16 is a flowchart illustrating a pen recognition method according to the present disclosure.

FIG. 16 is a flowchart illustrating a pen recognition method according to the present aspects.

Referring to FIG. 16, based on the pen recognition method according to the present aspects, a pen recognition method for a link between the display device 10 and the active pen 20 may include a step S1610, in which the display device 10 supplies a first panel-driving pulse signal (LFD) to the panel 310, a second step S1620, in which the active pen 20 radiates a pen pulse signal (PENS) indicating pen identification information to the panel 310 through the pen tip 410 based on the first panel-driving pulse signal (LFD) and wirelessly transmitting pen data, and a third step S1630, in which the display device 10 performs pen recognition processing based on raw data generated by being read from the panel 310 to which the pen pulse signal (PENS) is radiated and on the pen data wirelessly transmitted from the active pen 20.

Through the pen recognition method, the display device 10 acquires pen identification information of the active pen 10 through the panel 310 and acquires pen data of the active pen 10 through a wireless communication path. That is, the display device 10 may acquire pieces of information (the pen identification information and the pen data) required for pen recognition through two paths (the panel and the wireless communication path).

Accordingly, the active pen 20 may transmit the pen data, which is a large amount of data, and the pen identification information to the display device 10 through two different paths. Therefore, the display device 10 may rapidly and accurately acquire information required for pen recognition processing (additional pen information with pen data, and pen identification information), thereby rapidly and accurately performing pen recognition processing.

Further, as the active pen 20 transmits the pen identification information to the display device 10, the display device 10 may distinguish between a plurality of active pens 20 and thus provide multi-pen recognition.

In step S1620, the active pen 20 may wirelessly transmit pen identification information in addition to pen data.

Accordingly, the active pen 20 may transmit the pen identification information, which is important for pen recognition (particularly, multi-pen recognition) to the display device 10 through two different paths. Therefore, the display device 10 may more accurately recognize the active pen 20 and may accurately distinguish between two or more active pens 20 and simultaneously provide pen recognition processing thereof. As a result, the user may perform touch, writing, or input by simultaneously using two or more active pens 20.

Figure 17:
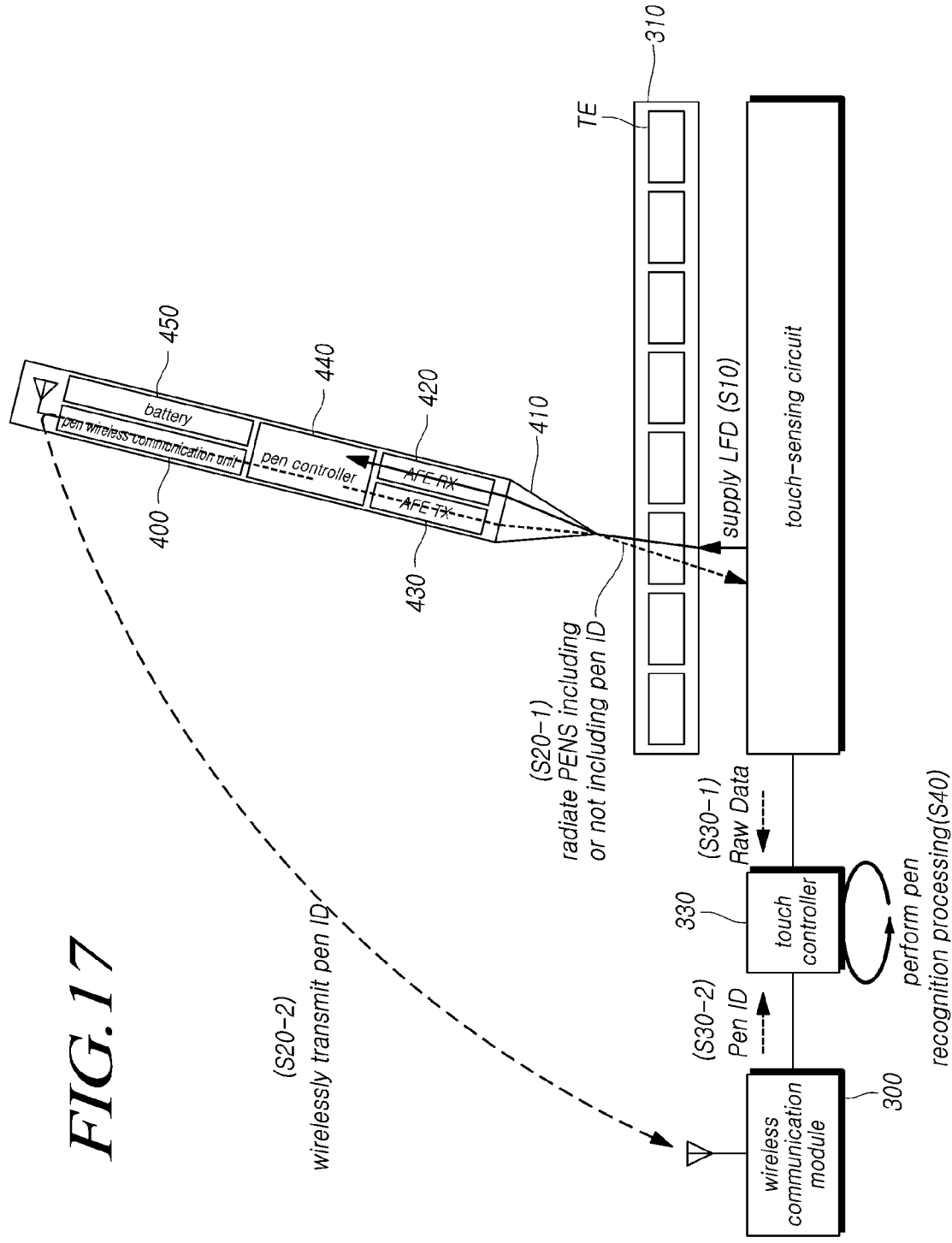
FIG. 17 illustrates another pen recognition process according to the present disclosure.

FIG. 17 illustrates another pen recognition process according to the present aspects.

The pen recognition process illustrated in FIG. 17 is almost the same as the pen recognition process of FIG. 5.

However, the active pen 20 basically provides the pen identification information (pen ID) to the touch controller 330 of the display device 10 through a wireless transmission scheme, and selectively provides the pen identification information (pen ID) to the touch controller 330 of the display device 10 through the panel 310.

In step S10, the touch-sensing circuit 320 of the display device 10 supplies the first panel-driving pulse signal (LFD) to the panel 310.

The active pen 20 radiates the pen pulse signal (PENS) to the panel 310 based on the first panel-driving pulse signal (LFD) supplied to the panel 310 in S20-1, and wirelessly transmits the pen identification information (pen ID) through the embedded pen wireless communication unit 400 in S20-2.

Here, the pen pulse signal (PENS) radiated from the active pen 20 may be synchronized and pulsed according to pulsing of the first panel-driving pulse signal (LFD), and may not include the pen identification information (pen ID).

That is, the pen identification information may be duplicated through two paths and thus may not be provided to the display device 10.

In this case, the active pen 20 may easily generate the pen pulse signal (PENS) based on the first panel-driving pulse signal (LFD) supplied to the panel 310.

Alternatively, the pen pulse signal (PENS) radiated from the active pen 20 may selectively include the pen identification information (pen ID), as illustrated in FIG. 6.

The touch-sensing circuit 320 of the display device 10 outputs, to the touch controller 330, the raw data read from the panel 310 to which the pen pulse signal (PENS) is radiated by supplying the first panel-driving pulse signal (LFD) to the panel 310, in S30-1.

The wireless communication module 300 of the display device 10 receives pen identification information wirelessly transmitted from the active pen 20 and outputs the pen identification information to the touch controller 330 in S30-2.

The touch controller 330 of the display device 10 may perform pen recognition processing based on the raw data output from the touch-sensing circuit 320 and the pen identification information output from the wireless communication module 300.

Meanwhile, in addition, the active pen 20 may additionally and wirelessly transmit pen data selectively together with the pen identification information through the embedded pen wireless communication unit 400.

In this case, the display device 10 may be made aware of one or more pieces of additional pen information selected from among a writing pressure, an inclination, control information, and button input information of the active pen 20 from the pen data, so that more precise pen recognition can be processed.

Figure 18:
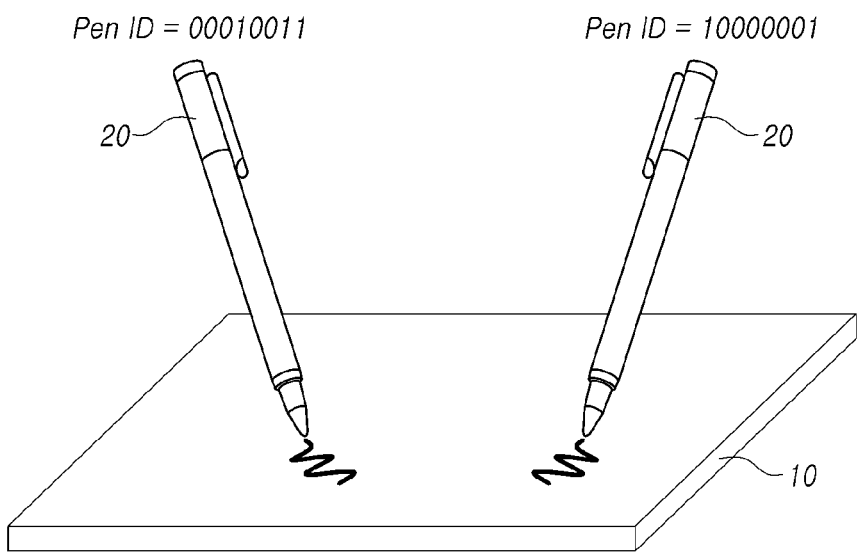
FIG. 18 illustrates multi-pen recognition according to the present disclosure.

FIG. 18 illustrates multi-pen recognition according to the present aspects.

Referring to FIG. 18, when two or more active pens 20 transmit pen identification information important for pen recognition (particularly multi-pen recognition) to the display device 10, the display device 10 may manage pen identification information (for example, 00010011 and 10000001) of the two or more active pens 20 in the form of a list.

Further, the display device 10 performs pen recognition processing based on the link between the raw data and the pen data (writing pressure, inclination, control information, and button input information) of each active pen 20 and the corresponding pen identification information, thereby accurately and distinguishably detecting the presence or absence of the touch of each of the two or more active pens 20 and the touch locations thereof.

Meanwhile, in order to detect the active pen 20, the conventional pen recognition technology may perform pen recognition through a full-scan process of sensing an entire area of the panel 310 and a local sensing process of acquiring pen data by repeatedly sensing only some areas of the panel 310 in which the presence of an active pen 20 has been detected.

However, the pen recognition method according to the present aspects may detect the active pen 20 and simultaneously detect the presence or absence of the touch of the active pen 20 and/or the touch location thereof and the presence or absence of the touch of a finger and/or the touch location thereof merely through the full-scan process, without separately performing the full-scan process of detecting the active pen 20 and the local sensing process of acquiring pen data.

The pen recognition method according to the present aspects detects the active pen 20 and simultaneously detects the presence or absence of the touch of the active pen 20 and/or the touch location thereof and the presence or absence of the touch of the finger and/or the touch location thereof through the full-scan process without the local sensing process, thereby accurately detecting the touch location of the finger or the active pen 20 and more accurately tracking the movement of the finger or the active pen 20.

Further, the conventional pen recognition method cannot provide pen recognition processing (including location detection) for two or more active pens 20, but the pen recognition method according to the present aspects can simultaneously provide pen recognition process (including location detection) for two or more active pens 20.

According to the present aspects described above, it is possible to provide the touch-sensing system, the display device 10, the active pen 20, and the pen recognition method capable of performing rapid and accurate pen recognition.

Further, according to the present aspects, it is possible to provide the touch-sensing system, the display device 10, the active pen 20, and the pen recognition method capable of simultaneously processing the pen input through many active pens 20 by distinguishably recognizing the many active pens 20 and distinguishably processing pen data of the many active pens 20.

In addition, according to the present aspects, is possible to provide the touch-sensing system, the display device 10, and the active pen 20, and the pen recognition method capable of transmitting and receiving reliable information required for pen recognition when a signal is transmitted and received between the active pen 20 and the display device 10 for pen recognition.

Moreover, according to the present aspects, is possible to provide the touch-sensing system, the display device 10, the active pen 20, and the pen recognition method capable of accurately and rapidly sensing the touch of a finger and the touch of the active pen 20 at the same time.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch-sensing system comprising:
   an active pen; and
   a display device including a panel, on which a plurality of touch electrodes are arranged, and which is configured to perform pen recognition processing based on a link with the active pen,
   wherein the active pen is configured to:
   radiate a pen pulse signal indicating pen identification information to the panel through a pen tip, and
   wirelessly transmit pen data and pen identification information through an embedded pen wireless communication unit,
   the display device includes:
   a touch-sensing circuit configured to supply a first panel-driving pulse signal to the panel and output raw data read from the panel to which the pen pulse signal is radiated;
   a wireless communication module configured to receive and output the pen data and the pen identification information wirelessly transmitted from the active pen; and
   a touch controller configured to acquire the pen identification information from the raw data output from the touch-sensing circuit and perform pen recognition processing based on the acquired pen identification information, and the pen data and the pen identification information output from the wireless communication module,
   wherein the pen pulse signal is a signal for detecting a location of the active pen, and is output from the pen tip of the active pen and applied to at least one touch electrode of the panel of the display device,
   the pen data is not related to the location detection of the active pen and includes at least one additional pen information, the pen data is wirelessly transmitted from the active pen to the wireless communication module of the display device, and
   the pen identification information is applied to the at least one touch electrode of the panel of the display device through the pen pulse signal and subsequently wirelessly transmitted from the active pen to the wireless communication module of the display device,
   wherein while the first panel-driving pulse signal is applied to the at least one touch electrode of the panel, a first signal corresponding to the first panel-driving pulse signal is applied to all or some of a plurality of data lines of the panel or a second signal corresponding to the first panel-driving pulse signal is applied to all or some of a plurality of gate lines of the panel, and
   wherein the first signal or the second signal is in phase with the first panel-driving pulse signal.

2. The touch-sensing system of claim 1, wherein the active pen is configured to:
   receive, by the pen tip, the first panel-driving pulse signal including a plurality of panel-driving pulses through the panel, and
   radiate the pen pulse signal including a plurality of pen pulses indicating a plurality of digital codes corresponding to the pen identification information to the panel based on the first panel-driving pulse signal.

3. The touch-sensing system of claim 2, wherein the plurality of pen pulses included in the pen pulse signal includes a first pen pulse indicating a first digital code and a second pen pulse indicating a second digital code,
   the first pen pulse is pulsed at a rising time of a corresponding panel-driving pulse among the plurality of panel-driving pulses, and
   the second pen pulse is pulsed at a falling time of a corresponding panel-driving pulse among the plurality of panel-driving pulses.

4. The touch-sensing system of claim 3, wherein the raw data read from the panel includes a plurality of read values having a real number within a range greater than or equal to −N (N is a preset positive real number) and smaller than or equal to +P (P is a preset positive real number),
   the plurality of read values includes a first read value for the first pen pulse and a second read value for the second pen pulse, and
   a sign of the first read value is opposite a sign of the second read value.

5. The touch-sensing system of claim 4, wherein the touch controller is configured to:
   determine a plurality of digital codes based on a sign of each of the plurality of read values included in the raw data output from the touch-sensing circuit, and
   acquire pen identification information including the plurality of determined digital codes.

6. The touch-sensing system of claim 3, wherein the raw data read from the panel includes a plurality of read values having a real number within a range greater than or equal to −N (N being a preset positive real number) and smaller than or equal to +P (P being a preset positive real number), and
   the touch controller detects presence or absence of a location of the active pen or a finger based on a distribution of all or some of the plurality of read values on the panel.

7. The touch-sensing system of claim 1, wherein
   an operation section of the display device includes a display-driving section and a touch-driving section, and
   the touch-driving section includes an uplink transmission section (ULNK) for transmitting a signal from the display device to the active pen and a downlink transmission section (DLNK) for transmitting a signal from the active pen to the display device.

8. The touch-sensing system of claim 7, wherein the first panel-driving pulse signal is supplied to the panel, the pen pulse signal indicating the pen identification information is radiated from the active pen to the panel, and the pen data is wirelessly transmitted from the active pen to the wireless communication module in the downlink transmission section (DLNK),
   a second panel-driving pulse signal or a third panel-driving pulse signal is supplied to the panel, and the second panel-driving pulse signal or the third panel-driving pulse signal is input from the panel to the active pen in the uplink transmission section (ULNK), and
   the second panel-driving pulse signal or the third panel-driving pulse signal is distinguished from the first panel-driving pulse signal in the uplink transmission section (ULNK).

9. The touch-sensing system of claim 8, wherein the first panel-driving pulse signal is a signal having a periodic pattern in which a high-level section and a low-level section alternate,
   the second panel-driving pulse signal is a beacon signal carrying panel information,
   the third panel-driving pulse signal is a ping signal carrying touch-driving section information, and
   the first panel-driving pulse signal, the second panel-driving pulse signal, and the third panel-driving pulse signal are distinguished from each other.

10. The touch-sensing system of claim 1, wherein the active pen further includes a pen wireless communication unit configured to wirelessly transmit the pen data, and
the pen wireless communication unit is configured to spectrum-spread the pen data based on a pseudo noise code and wirelessly transmit the pen data to the wireless communication module of the display device.

11. A display device configured to perform pen recognition processing based on a link with an active pen, the display device comprising:
a panel on which a plurality of touch electrodes are arranged;
a touch-sensing circuit configured to:
supply a first panel-driving pulse signal, and
output raw data generated by reading a pen pulse signal, which is radiated from the active pen to the panel and indicates pen identification information through the panel;
a wireless communication module configured to receive and output pen data and the pen identification information wirelessly transmitted from the active pen; and
a touch controller configured to acquire the pen identification information from the raw data output from the touch-sensing circuit and perform pen recognition processing based on the acquired pen identification information, and the pen data and the pen identification information output from the wireless communication module,
wherein the pen pulse signal is a signal for detecting a location of the active pen, and is output from a pen tip of the active pen and applied to at least one touch electrode of the panel of the display device,
the pen data is not related to the location detection of the active pen and includes at least one additional pen information, the pen data is wirelessly transmitted from the active pen to the wireless communication module of the display device, and
the pen identification information is applied to the at least one touch electrode of the panel of the display device through the pen pulse signal and subsequently wirelessly transmitted from the active pen to the wireless communication module of the display device,
wherein while the first panel-driving pulse signal is applied to the at least one touch electrode of the panel, a first signal corresponding to the first panel-driving pulse signal is applied to all or some of a plurality of data lines of the panel or a second signal corresponding to the first panel-driving pulse signal is applied to all or some of a plurality of gate lines of the panel, and
wherein the first signal or the second signal is in phase to the first panel-driving pulse signal.

12. A panel included in a display device linking with an active pen, the panel comprising:
a plurality of data lines arranged in a first direction;
a plurality of gate lines arranged in a second direction; and
a plurality of touch electrodes for touch sensing,
wherein an image data signal is applied to the plurality of data lines and a gate signal is applied to the plurality of gate lines in a display-driving section,
a touch-driving section corresponding to a blank section between two display-driving sections includes an uplink transmission section for signal transmission from the display device to the active pen and a downlink transmission section for signal transmission from the active pen to the display device,
a pen pulse signal output from the active pen is applied to all or some of the plurality of touch electrodes during the downlink transmission section, and
a second panel-driving pulse signal or a third panel-driving pulse signal distinguished from a first panel-driving pulse signal is outputted from a touch-sensing circuit in the display device, the second panel-driving pulse signal or the third panel-driving pulse signal are applied to all or some of the plurality of touch electrodes and delivered to the active pen during the uplink transmission section, the first panel-driving pulse signal is outputted from a touch-sensing circuit in the display device and applied to all or some of the plurality of touch electrodes and transmitted to the active pen in the downlink transmission section,
wherein while the first panel-driving pulse signal is applied to at least one touch electrode of the panel, a first signal corresponding to the first panel-driving pulse signal is applied to all or some of a plurality of data lines of the panel or a second signal corresponding to the first panel-driving pulse signal is applied to all or some of a plurality of gate lines of the panel, and
wherein the first signal or the second signal is in phase to the first panel-driving pulse signal.

13. The panel of claim 12, wherein a signal corresponding to the first panel-driving pulse signal is applied to all or some of the plurality of data lines or a signal corresponding to the first panel-driving pulse signal is applied to all or some of the plurality of gate lines in the downlink transmission section.

14. An active pen configured to link with a display device, the active pen comprising:
a pen tip in contact with or in proximity to a panel of the display device;
an analog front-end receiver configured to receive a first panel-driving pulse signal supplied to the panel through the pen tip;
an analog front-end transmitter configured to radiate a pen pulse signal indicating pen identification information through the pen tip based on the first panel-driving pulse signal; and
a pen wireless communication unit configured to wirelessly transmit pen data and the pen identification information,
wherein the pen pulse signal is a signal for detecting a location of the active pen, and is output from a pen tip of the active pen and applied to at least one touch electrode of the panel of the display device,
the pen data is not related to the location detection of the active pen and includes at least one additional pen information, the pen data is wirelessly transmitted from the active pen to a wireless communication module of the display device, and
the pen identification information is applied to the at least one touch electrode of the panel of the display device through the pen pulse signal and subsequently wirelessly transmitted from the active pen to the wireless communication module of the display device,
wherein while the first panel-driving pulse signal is applied to the at least one touch electrode of the panel, a first signal corresponding to the first panel-driving pulse signal is applied to all or some of a plurality of data lines of the panel or a second signal corresponding to the first panel-driving pulse signal is applied to all or some of a plurality of gate lines of the panel, and
wherein the first signal or the second signal is in phase to the first panel-driving pulse signal.

15. The active pen of claim 14, wherein the first panel-driving pulse signal includes a plurality of panel-driving pulses, and
the pen pulse signal includes a plurality of pen pulses indicating a plurality of digital codes corresponding to the pen identification information based on the first panel-driving pulse signal.

16. The active pen of claim 15, wherein the plurality of pen pulses included in the pen pulse signal includes a first pen pulse indicating a first digital code and a second pen pulse indicating a second digital code,
the first pen pulse is pulsed at a rising time of a corresponding panel-driving pulse among the plurality of panel-driving pulses, and
the second pen pulse is pulsed at a falling time of a corresponding panel-driving pulse among the plurality of panel-driving pulses.

17. The active pen of claim 14, wherein the pen wireless communication unit is configured to wirelessly transmit the pen identification information in addition to the pen data.

18. A pen recognition method performed through a link with an active pen of a display device, the pen recognition method comprising:
supplying a first panel-driving pulse signal to a panel by the display device;
radiating a pen pulse signal indicating pen identification information to the panel through a pen tip based on the first panel-driving pulse signal and wirelessly transmitting pen data and pen identification information by the active pen; and
performing pen recognition processing based on raw data generated by being read from the panel, to which the pen pulse signal is radiated, and the pen data and the pen identification information wirelessly transmitted from the active pen by the display device,
wherein the pen pulse signal is a signal for detecting a location of the active pen, and is output from the pen tip of the active pen and applied to at least one touch electrode of the panel of the display device,
the pen data is not related to the location detection of the active pen and includes at least one additional pen information, the pen data is wirelessly transmitted from the active pen to a wireless communication module of the display device, and
the pen identification information is applied to the at least one touch electrode of the panel of the display device through the pen pulse signal and subsequently wirelessly transmitted from the active pen to the wireless communication module of the display device,
wherein while the first panel-driving pulse signal is applied to the at least one touch electrode of the panel, a first signal corresponding to the first panel-driving pulse signal is applied to all or some of a plurality of data lines of the panel or a second signal corresponding to the first panel-driving pulse signal is applied to all or some of a plurality of gate lines of the panel, and
wherein the first signal or the second signal is in phase to the first panel-driving pulse signal.

19. The pen recognition method of claim 18, wherein the active pen wirelessly transmits the pen data in addition to the pen identification information when radiating the pen pulse signal to the panel through the pen tip.

* * * * *